United States Patent
Herz et al.

(10) Patent No.: US 9,229,634 B2
(45) Date of Patent: *Jan. 5, 2016

(54) PORTABLE MULTIFUNCTION DEVICE, METHOD, AND GRAPHICAL USER INTERFACE FOR INTERPRETING A FINGER GESTURE

(71) Applicant: Apple Inc., Cupertino, CA (US)

(72) Inventors: Scott Herz, San Jose, CA (US); Scott Forstall, Los Altos, CA (US); Michael Matas, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/197,111

(22) Filed: Mar. 4, 2014

(65) Prior Publication Data

US 2014/0340327 A1 Nov. 20, 2014

Related U.S. Application Data

(63) Continuation of application No. 12/217,038, filed on Jun. 30, 2008, now Pat. No. 8,665,225, which is a continuation-in-part of application No. 11/961,700, filed on Dec. 20, 2007, now abandoned.

(Continued)

(51) Int. Cl.
*G06F 3/041* (2006.01)
*G06F 3/0488* (2013.01)
(Continued)

(52) U.S. Cl.
CPC ............ *G06F 3/04883* (2013.01); *G06F 3/041* (2013.01); *G06F 3/044* (2013.01);
(Continued)

(58) Field of Classification Search
None
See application file for complete search history.

(56) References Cited

U.S. PATENT DOCUMENTS

| 5,943,052 A | 8/1999 | Allen et al. |
| 5,973,676 A | 10/1999 | Kawakura |

(Continued)

FOREIGN PATENT DOCUMENTS

| EP | 0795811 A1 * | 9/1997 |
| WO | 97/18508 A1 | 5/1997 |

(Continued)

OTHER PUBLICATIONS

Microsoft Office Outlook 2003 Product Guide, 2004, Microsoft Corporation, p. 29.*

(Continued)

*Primary Examiner* — Grant Sitta
*Assistant Examiner* — Kirk Hermann
(74) *Attorney, Agent, or Firm* — Morrison & Foerster LLP

(57) ABSTRACT

A portable device with a touch screen display detects a finger-in-contact event at a first position on the touch screen display and identifies a user interface object associated with the first position. The portable device determines whether the identified user interface object is moveable across the touch screen display. For an identified object that is determined to be moveable across the touch screen display, the portable device detects a sequence of one or more first finger-dragging, a first finger-out-of-contact, one or more second finger-dragging, and a first finger-out-of-range events and performs a first operation associated with the identified moveable user interface object at least in part in accordance with the first and second finger-dragging events. For an identified not moveable object, the portable device detects a second finger-out-of-contact event and performs a second operation, different from the first operation in response to a second finger-out-of-contact event.

56 Claims, 12 Drawing Sheets

Related U.S. Application Data

(60) Provisional application No. 60/947,140, filed on Jun. 29, 2007, provisional application No. 60/937,993, filed on Jun. 29, 2007, provisional application No. 60/879,469, filed on Jan. 8, 2007, provisional application No. 60/879,253, filed on Jan. 7, 2007.

(51) Int. Cl.
*G06F 3/044* (2006.01)
*G06F 3/0484* (2013.01)
*G06F 3/0485* (2013.01)

(52) U.S. Cl.
CPC ......... *G06F 3/0488* (2013.01); *G06F 3/04845* (2013.01); *G06F 3/04847* (2013.01); *G06F 3/04855* (2013.01); *G06F 2203/04104* (2013.01); *G06F 2203/04808* (2013.01); *H04M 2250/22* (2013.01)

(56) References Cited

U.S. PATENT DOCUMENTS

| | | | |
|---|---|---|---|
| 6,492,979 B1 * | 12/2002 | Kent et al. | 345/173 |
| 6,542,171 B1 | 4/2003 | Satou et al. | |
| 6,922,816 B1 | 7/2005 | Amin et al. | |
| 6,954,899 B1 | 10/2005 | Anderson | |
| 7,007,239 B1 | 2/2006 | Hawkins et al. | |
| D611,054 S * | 3/2010 | Lin et al. | D14/486 |
| 7,730,401 B2 | 6/2010 | Gillespie et al. | |
| 2002/0180763 A1 * | 12/2002 | Kung | 345/660 |
| 2004/0021643 A1 * | 2/2004 | Hoshino et al. | 345/173 |
| 2004/0178997 A1 | 9/2004 | Gillespie et al. | |
| 2004/0218104 A1 | 11/2004 | Smith et al. | |
| 2005/0275637 A1 | 12/2005 | Hinckley et al. | |
| 2006/0092142 A1 | 5/2006 | Gillespie et al. | |
| 2006/0132456 A1 * | 6/2006 | Anson | 345/173 |
| 2006/0277488 A1 | 12/2006 | Cok et al. | |
| 2007/0062852 A1 | 3/2007 | Zachut et al. | |
| 2007/0124503 A1 * | 5/2007 | Ramos et al. | 709/248 |
| 2007/0150842 A1 | 6/2007 | Chaudhri et al. | |
| 2007/0192744 A1 | 8/2007 | Reponen | |
| 2007/0195067 A1 * | 8/2007 | Zotov et al. | 345/179 |
| 2008/0012835 A1 * | 1/2008 | Rimon et al. | 345/173 |
| 2008/0180391 A1 * | 7/2008 | Auciello et al. | 345/156 |
| 2010/0220062 A1 | 9/2010 | Antila | |
| 2011/0037725 A1 | 2/2011 | Pryor | |

FOREIGN PATENT DOCUMENTS

| | | |
|---|---|---|
| WO | WO 9718508 A1 * | 5/1997 |
| WO | 02/103669 A1 | 12/2002 |
| WO | 2004/051392 A2 | 6/2004 |
| WO | 2006/115946 A2 | 11/2006 |

OTHER PUBLICATIONS

International Preliminary Report on Patentability received for PCT Patent Application No. PCT/US2007/089030, mailed on Jul. 7, 2009, 7 pages.

International Search Report and Written Opinion received for PCT Patent Application No. PCT/US2007/089030, mailed on Jul. 9, 2008, 9 pages.

International Preliminary Report on Patentability received for PCT Patent Application No. PCT/US2009/039625, mailed on Jan. 5, 2011, 6 pages.

International Search Report and Written Opinion received for PCT Patent Application No. PCT/US2009/039625, mailed on Jun. 5, 2009, 8 pages.

Final Office Action received for U.S. Appl. No. 11/961,700, mailed on Sep. 29, 2011, 33 pages.

Non-Final Office Action received for U.S. Appl. No. 11/961,700, mailed on Mar. 29, 2011, 26 pages.

Final Office Action received for U.S. Appl. No. 12/217,038, mailed on Oct. 31, 2011, 83 pages.

Non-Final Office Action received for U.S. Appl. No. 12/217,038, mailed on Aug. 17, 2012, 42 pages.

Non-Final Office Action received for U.S. Appl. No. 12/217,038, mailed on Feb. 24, 2012, 167 pages.

Non-Final Office Action received for U.S. Appl. No. 12/217,038, mailed on Jun. 14, 2011, 92 pages.

Non-Final Office Action received for U.S. Appl. No. 12/217,038, mailed on Mar. 21, 2013, 46 pages.

Notice of Allowance received for U.S. Appl. No. 12/217,038, mailed on Oct. 18, 2013, 15 pages.

Microsoft Corporation, "Microsoft Word 2000 (9.0.2720)", MSWord Figures 1-5, 1999, 5 pages.

* cited by examiner

PORTABLE MULTIFUNCTION DEVICE, METHOD, AND GRAPHICAL USER INTERFACE FOR INTERPRETING A FINGER GESTURE

RELATED APPLICATIONS

This application is a continuation of U.S. patent application Ser. No. 12/217,038, "Portable Multifunction Device, Method, and Graphical User Interface for Interpreting a Finger Swipe Gesture," filed on Jun. 20, 2008, which is a continuation in part of U.S. patent application Ser. No. 11/961,700, "Portable Multifunction Device, Method, and Graphical User Interface for Interpreting a Finger Swipe Gesture," filed Dec. 20, 2007, which in turn claims priority to U.S. Provisional Patent Application Nos. 60/937,993, "Portable Multifunction Device," filed Jun. 29, 2007; 60/947,140, "Portable Multifunction Device, Method, and Graphical User Interface for Interpreting a Finger Swipe Gesture," filed Jun. 29, 2007; 60/879,469, "Portable Multifunction Device," filed Jan. 8, 2007; and 60/879,253, "Portable Multifunction Device," filed Jan. 7, 2007. All of these applications are incorporated by reference herein in their entirety.

This application is related to the following applications: (1) U.S. patent application Ser. No. 10/188,182, "Touch Pad For Handheld Device," filed Jul. 1, 2002; (2) U.S. patent application Ser. No. 10/722,948, "Touch Pad For Handheld Device," filed Nov. 25, 2003; (3) U.S. patent application Ser. No. 10/643,256, "Movable Touch Pad With Added Functionality," filed Aug. 18, 2003; (4) U.S. patent application Ser. No. 10/654,108, "Ambidextrous Mouse," filed Sep. 2, 2003; (5) U.S. patent application Ser. No. 10/840,862, "Multipoint Touchscreen," filed May 6, 2004; (6) U.S. patent application Ser. No. 10/903,964, "Gestures For Touch Sensitive Input Devices," filed Jul. 30, 2004; (7) U.S. patent application Ser. No. 11/038,590, "Mode-Based Graphical User Interfaces For Touch Sensitive Input Devices" filed Jan. 18, 2005; (8) U.S. patent application Ser. No. 11/057,050, "Display Actuator," filed Feb. 11, 2005; (9) U.S. patent application Ser. No. 11/367,749, "Multi-Functional Hand-Held Device," filed Mar. 3, 2006; and (10) U.S. patent application Ser. No. 11/850,635, "Touch Screen Device, Method, and Graphical User Interface for Determining Commands by Applying Heuristics," filed Sep. 5, 2007. All of these applications are incorporated by reference herein in their entirety.

TECHNICAL FIELD

The disclosed embodiments relate generally to portable electronic devices, and more particularly, to a portable multifunctional device that interprets a finger gesture on the touch screen display and performs operations accordingly.

BACKGROUND

As portable electronic devices become more compact, and the number of functions performed by a given device increase, it has become a significant challenge to design a user interface that allows users to easily interact with a multifunction device. This challenge is particular significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This is unfortunate because it may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

A touch-sensitive screen is often used by a portable device because the screen can render different types of virtual service control objects such as virtual push buttons associated with different services. A user can activate these virtual service control objects through different types of finger contacts with the touch screen such as finger tap gestures and finger swipe gestures. For example, a finger tap gesture on an alphanumeric key icon enters the user-selected character into a specific field on the touch screen and a finger swipe gesture may move a slider icon from one position to another position by a specific distance.

Unfortunately, conventional approaches fail to recognize and/or use differences between finger tap gestures and finger swipe gestures on the touch screen display that can be used to make the device respond more efficiently to such gestures (e.g., responding faster to tap gestures and moving a slider icon by a distance that more accurately reflects the touch gesture). Accordingly, there is a need for portable devices with touch screen displays that respond more accurately and efficiently to touch input by a user.

SUMMARY

The above deficiencies and other problems associated with user interfaces for portable devices are reduced or eliminated by the disclosed portable multifunction device. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include telephoning, video conferencing, e-mailing, instant messaging, blogging, digital photographing, digital videoing, web browsing, digital music playing, and/or digital video playing. Instructions for performing these functions may be included in a computer program product configured for execution by one or more processors.

One aspect of the invention involves a computer-implemented method performed by a portable multifunction device with a touch screen display. The portable device detects a finger-in-contact at a first position on the touch screen display and then identifies a user interface object associated with the first position. In response to detecting a finger-dragging event on or near the touch screen display, the finger-dragging event having an associated position on the touch screen display, the portable device moves the user interface object from its current position to a transit position determined at least in part by the finger-dragging event's associated position on the touch screen display. For subsequent finger-dragging events, the portable device repeatedly moves the user interface object until a finger-out-of-range event is detected at a second position.

In some embodiments, the user interface object includes a slide object. In response to detecting a finger-dragging event, the portable device moves the slide object along a slide bar from its current position to a transit position determined at least in part by the finger-dragging event's associated position on the touch screen display and repeats the operations of detecting the finger-dragging event and moving the slide object until a finger-out-of-range event is detected at a second position on the touch screen display.

Another aspect of the invention involves a graphical user interface on a portable multifunction device with a touch screen display. The graphical user interface includes a plurality of user interface objects. A first position corresponding to a finger-in-contact event is detected and a user interface object associated with the first position is identified. A finger-dragging event on or near the touch screen display is detected, the finger-dragging event having an associated position on the touch screen display, and the user interface object is moved from its current position to a transit position determined at least in part by the finger-dragging event's associated position on the touch screen display. In response to subsequent finger-dragging events, the user interface object is moved repeatedly until a finger-out-of-range event is detected at a second position.

Another aspect of the invention involves a portable electronic device with a touch screen display with a plurality of user interface objects. The device includes one or more processors, memory, and one or more programs stored in the memory and configured to be executed by the one or more processors. The one or more programs include: instructions for detecting a finger-in-contact event at a first position on the touch screen display; instructions for identifying a user interface object associated with the first position; instructions for detecting a finger-dragging event on or near the touch screen display, the finger-dragging event having an associated position on the touch screen display; instructions for moving the user interface object from its current position to a transit position determined at least in part by the finger-dragging event's associated position on the touch screen display; and instructions for repeating said operations of detecting the finger-dragging event and moving the user interface object until a finger-out-of-range event is detected at a second position.

Another aspect of the invention involves a computer readable storage medium that stores one or more programs. The one or more programs include instructions that, when executed by a portable electronic device having a touch screen display, cause the device to: detect a finger-in-contact event at a first position on the touch screen display; identify a user interface object associated with the first position; detect a finger-dragging event on or near the touch screen display, the finger-dragging event having an associated position on the touch screen display; move the user interface object from its current position to a transit position determined at least in part by the finger-dragging event's associated position on the touch screen display; and repeat said operations of detecting the finger-dragging event and moving the user interface object until a finger-out-of-range event is detected at a second position.

Another aspect of the invention involves a portable electronic device with a touch screen display. The device includes: means for detecting a finger-in-contact event at a first position on the touch screen display; means for identifying a user interface object associated with the first position; means for detecting a finger-dragging event on or near the touch screen display, the finger-dragging event having an associated position on the touch screen display; means for moving the user interface object from its current position to a transit position determined at least in part by the finger-dragging event's associated position on the touch screen display; and means for repeating said operations of detecting the finger-dragging event and moving the user interface object until a finger-out-of-range event is detected at a second position.

Another aspect of the invention involves a computer-implemented method performed by a portable multifunction device with a touch screen display with a plurality of user interface objects. The portable device detects a finger-in-contact at a first position on the touch screen display and identifies a user interface object associated with the first position. The portable device determines whether the identified user interface object is moveable across the touch screen display.

For an identified user interface object that is determined to be moveable across the touch screen display, the portable device detects, in sequence, one or more first finger-dragging events, a first finger-out-of-contact event, one or more second finger-dragging events, and a first finger-out-of-range event. In response to detecting the one or more first and second finger-dragging events on or near the touch screen display after determining the identified user interface object is moveable, the portable device performs a first operation associated with the identified moveable user interface object at least in part in accordance with the one or more first and second finger-dragging events until the first finger-out-of-range event is detected at a second position on the touch screen display.

For an identified user interface object that is determined to be not moveable across the touch screen display, the portable device detects a second finger-out-of-contact event. In response to detecting the second finger-out-of-contact event after determining the identified user interface object is not moveable, the portable device performs a second operation, different from the first operation.

Another aspect of the invention involves a graphical user interface on a portable multifunction device with a touch screen display. The graphical user interface includes a plurality of user interface objects. A first position corresponding to a finger-in-contact event is detected and a user interface object associated with the first position is identified. A determination is made whether the identified user interface object is moveable across the touch screen display.

For an identified user interface object that is determined to be moveable across the touch screen display, a sequence of finger-related events, including one or more first finger-dragging events, a first finger-out-of-contact event, one or more second finger-dragging events, and a first finger-out-of-range event, are detected; and, in response to detecting the one or more first and second finger-dragging events on or near the touch screen display after determining the identified user interface object is moveable, a first operation associated with the identified moveable user interface object is performed at least in part in accordance with the one or more first and second finger-dragging events until the first finger-out-of-range event is detected at a second position on the touch screen display.

For an identified user interface object that is determined to be not moveable across the touch screen display, a second finger-out-of-contact event is detected; and in response to detecting the second finger-out-of-contact event after determining the identified user interface object is not moveable, a second operation, different from the first operation, is performed.

Another aspect of the invention involves a portable electronic device with a touch screen display with a plurality of user interface objects. The device includes one or more processors, memory, and one or more programs stored in the memory and configured to be executed by the one or more processors. The one or more programs include: instructions for detecting a finger-in-contact event at a first position on the touch screen display; instructions for identifying a user interface object associated with the first position; instructions for determining whether the identified user interface object is moveable across the touch screen display; for an identified user interface object that is determined to be moveable across the touch screen display: instructions for detecting, in sequence, one or more first finger-dragging events, a first finger-out-of-contact event, one or more second finger-dragging events, and a first finger-out-of-range event; and instructions for performing a first operation associated with the identified moveable user interface object at least in part in accordance with the one or more first and second finger-dragging events until the first finger-out-of-range event is detected at a second position on the touch screen display in response to detecting the one or more first and second finger-dragging events on or near the touch screen display after determining the identified user interface object is moveable; and for an identified user interface object that is determined to be not moveable across the touch screen display: instructions for detecting a second finger-out-of-contact event; and instructions for performing a second operation, different from the first operation in response to detecting the second finger-out-of-contact event after determining the identified user interface object is not moveable.

Another aspect of the invention involves a computer readable storage medium that stores one or more programs. The one or more programs include instructions that, when executed by a portable electronic device having a touch screen display, cause the device to: detect a finger-in-contact event at a first position on the touch screen display; identify a user interface object associated with the first position; determine whether the identified user interface object is moveable across the touch screen display; for an identified user interface object that is determined to be moveable across the touch screen display: detect, in sequence, one or more first finger-dragging events, a first finger-out-of-contact event, one or more second finger-dragging events, and a first finger-out-of-range event; and in response to detecting the one or more first and second finger-dragging events on or near the touch screen display after determining the identified user interface object is moveable, perform a first operation associated with the identified moveable user interface object at least in part in accordance with the one or more first and second finger-dragging events until the first finger-out-of-range event is detected at a second position on the touch screen display; and for an identified user interface object that is determined to be not moveable across the touch screen display: detect a second finger-out-of-contact event; and in response to detecting the second finger-out-of-contact event after determining the identified user interface object is not moveable, perform a second operation, different from the first operation.

Another aspect of the invention involves a portable electronic device with a touch screen display. The device includes: means for detecting a finger-in-contact event at a first position on the touch screen display; means for identifying a user interface object associated with the first position; means for determining whether the identified user interface object is moveable across the touch screen display; for an identified user interface object that is determined to be moveable across the touch screen display: means for detecting, in sequence, one or more first finger-dragging events, a first finger-out-of-contact event, one or more second finger-dragging events, and a first finger-out-of-range event; and means for performing a first operation associated with the identified moveable user interface object at least in part in accordance with the one or more first and second finger-dragging events until the first finger-out-of-range event is detected at a second position on the touch screen display in response to detecting the one or more first and second finger-dragging events on or near the touch screen display after determining the identified user interface object is moveable; and for an identified user interface object that is determined to be not moveable across the touch screen display: means for detecting a second finger-out-of-contact event; and means for performing a second operation, different from the first operation in response to detecting the second finger-out-of-contact event after determining the identified user interface object is not moveable.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
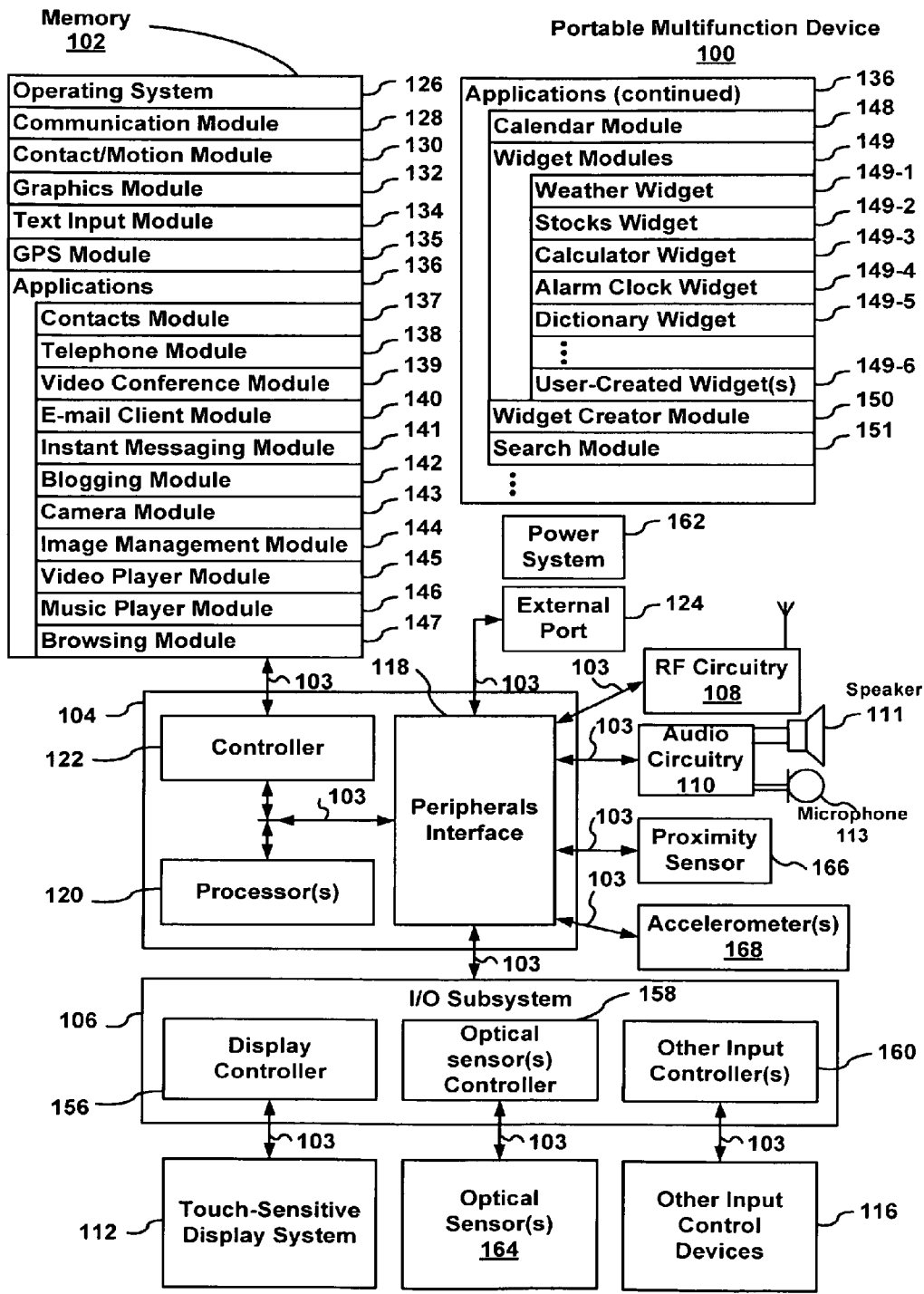
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, which may include one or more other physical user-interface devices, such as a physical click wheel, a physical keyboard, a mouse and/or a joystick.

The device supports a variety of applications, such as a telephone application, a video conferencing application, an e-mail application, an instant messaging application, a blogging application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference herein in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
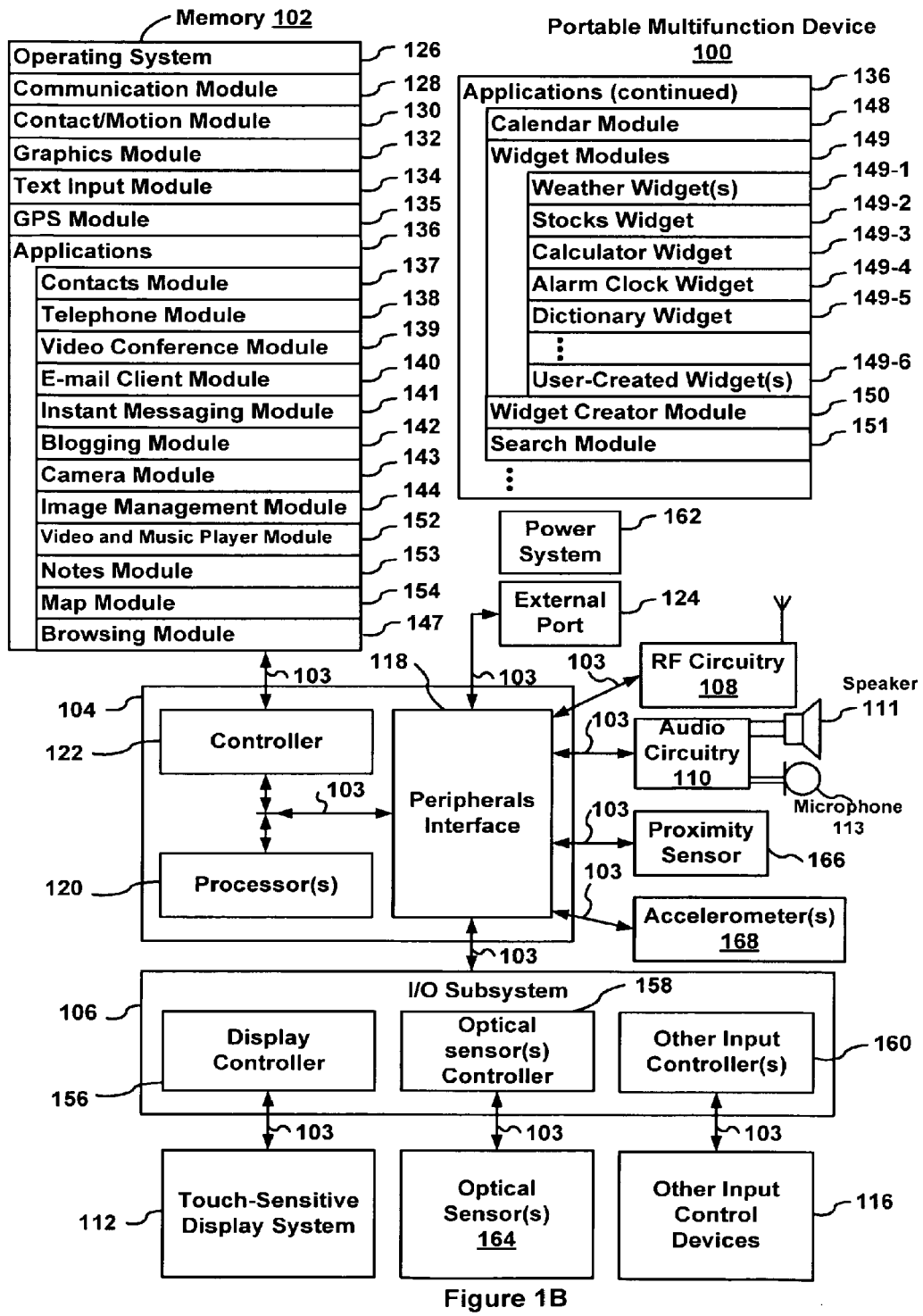

Attention is now directed towards embodiments of the device. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software or a combination of hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receives/end electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference herein in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference herein in their entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointercursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector in Handheld Device," filed Sep. 30, 2005; Ser. No. 11/240,788, "Proximity Detector In Handheld Device," filed Sep. 30, 2005; Ser. No. 11/620,702, "Using Ambient Light Sensor To Augment Proximity Sensor Output," filed Jan. 7, 2007; Ser. No. 11/586,862, "Automated Response To And Sensing Of User Activity In Portable Devices," filed Oct. 24, 2006; and Ser. No. 11/638,251, "Methods And Systems For Automatic Configuration Of Peripherals," filed Dec. 12, 2006, which are hereby incorporated by reference herein in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is in a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated herein by reference. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and mapnavigation widgets).

The applications 136 may include the following modules (or sets of instructions), or a subset or superset thereof:
 a contacts module 137 (sometimes called an address book or contact list);
 a telephone module 138;
 a video conferencing module 139;
 an e-mail client module 140;
 an instant messaging (IM) module 141;
 a blogging module 142;
 a camera module 143 for still and/or video images;
 an image management module 144;
 a video player module 145;
 a music player module 146;
 a browser module 147;
 a calendar module 148;
 widget modules 149, which may include weather widget 149-1, stocks widget 149-2, calculator widget 149-3, alarm clock widget 149-4, dictionary widget 149-5, and other widgets obtained by the user, as well as user-created widgets 149-6;
 widget creator module 150 for making user-created widgets 149-6;
 search module 151;
 video and music player module 152, which merges video player module 145 and music player module 146;
 notes module 153; and/or
 map module 154.

Examples of other applications 136 that may be stored in memory 102 include other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the video-conferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, image management module 144, and browsing module 147, the blogging module 142 may be used to send text, still images, video, add/or other graphics to a blog (e.g., the user's blog).

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
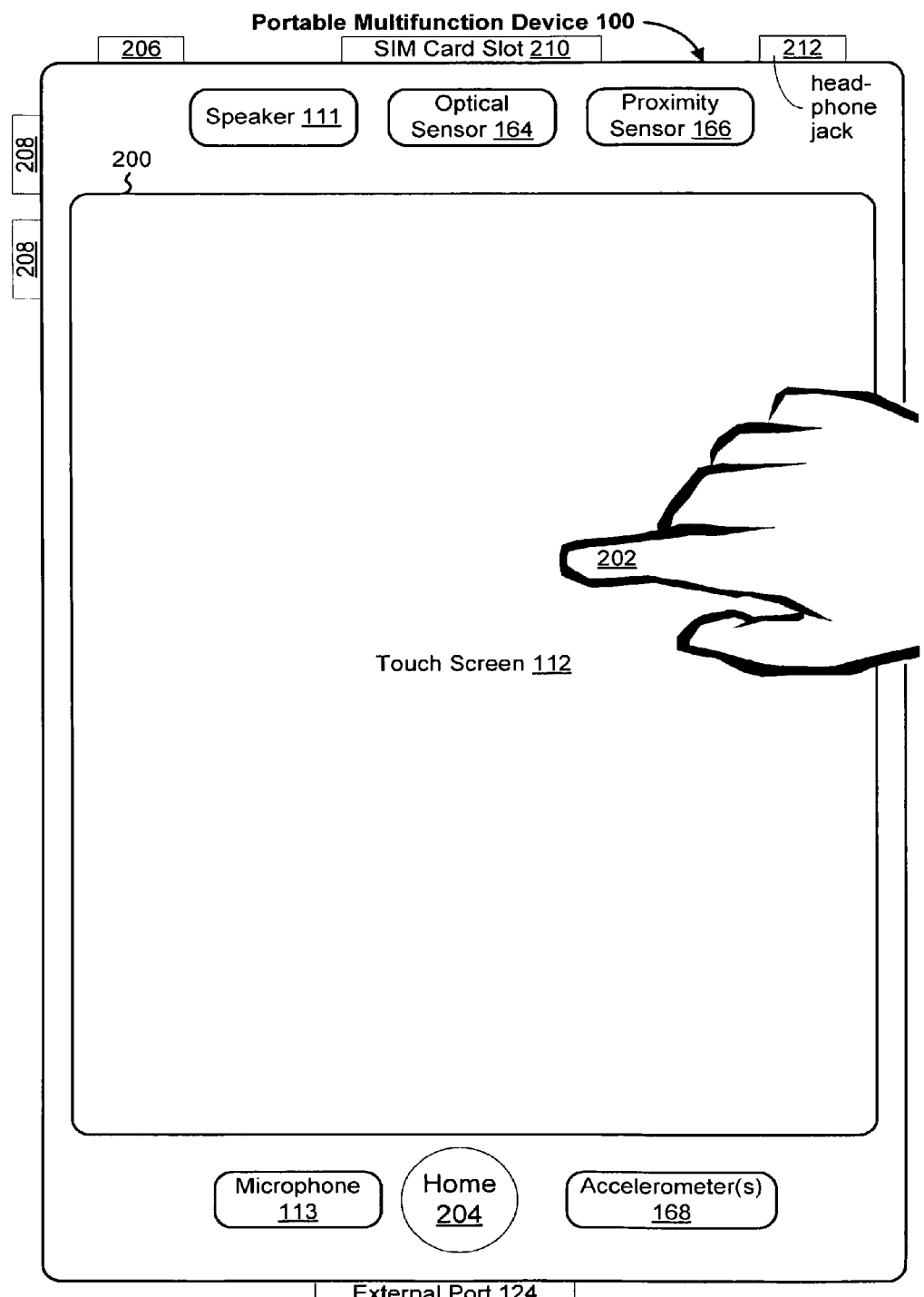
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3:
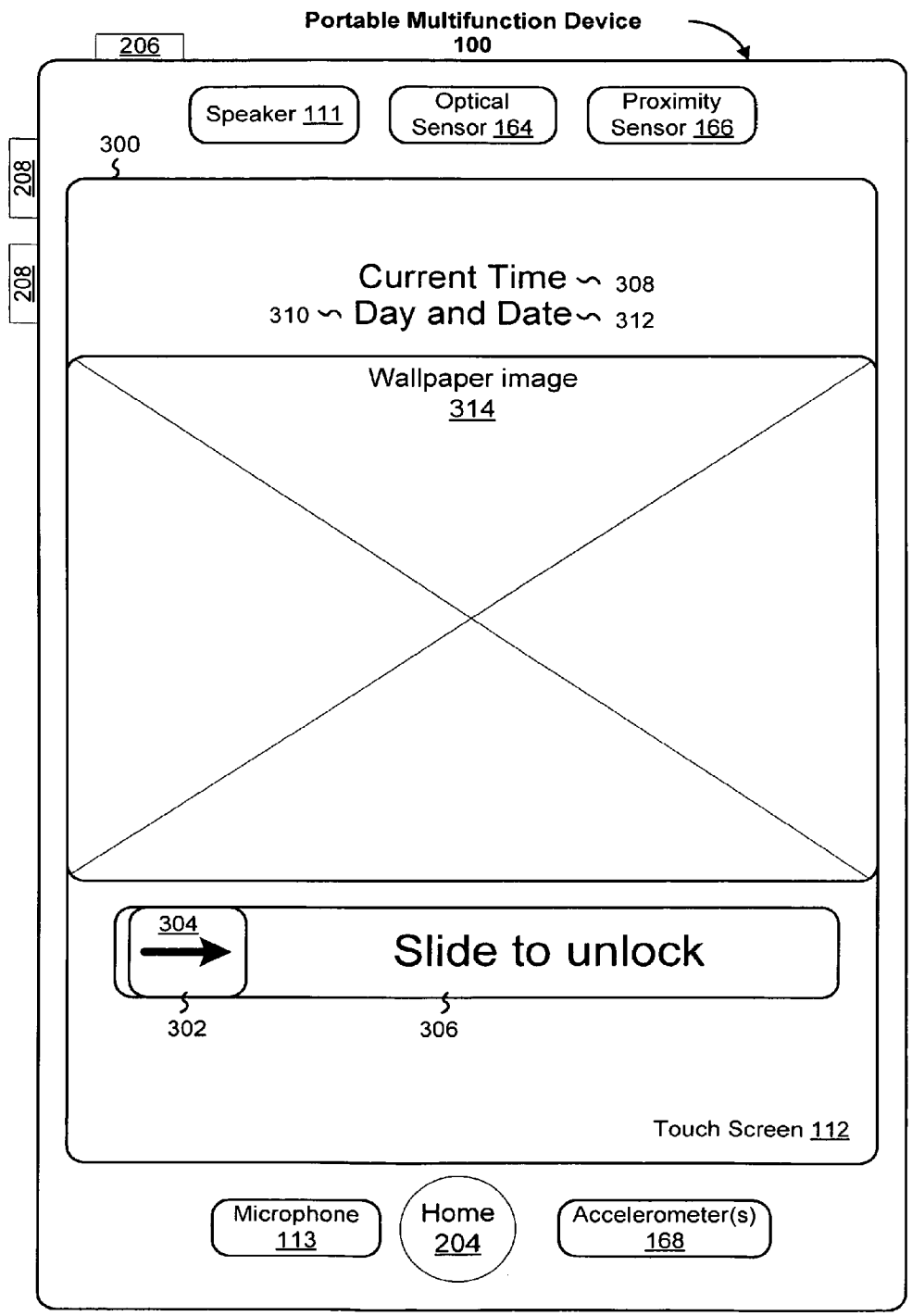
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:
Unlock image 302 that is moved with a finger gesture to unlock the device;
Arrow 304 that provides a visual cue to the unlock gesture;
Channel 306 that provides additional cues to the unlock gesture;
Time 308;
Day 310;
Date 312; and
Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent application Ser. No. 11/322,549, "Unlocking A Device By Performing Gestures On An Unlock Image," filed Dec. 23, 2005, and Ser. No. 11/322,550, "Indication Of Progress Towards Satisfaction Of A User Input Condition," filed Dec. 23, 2005, which are hereby incorporated by reference herein in their entirety.

Figure 4A:
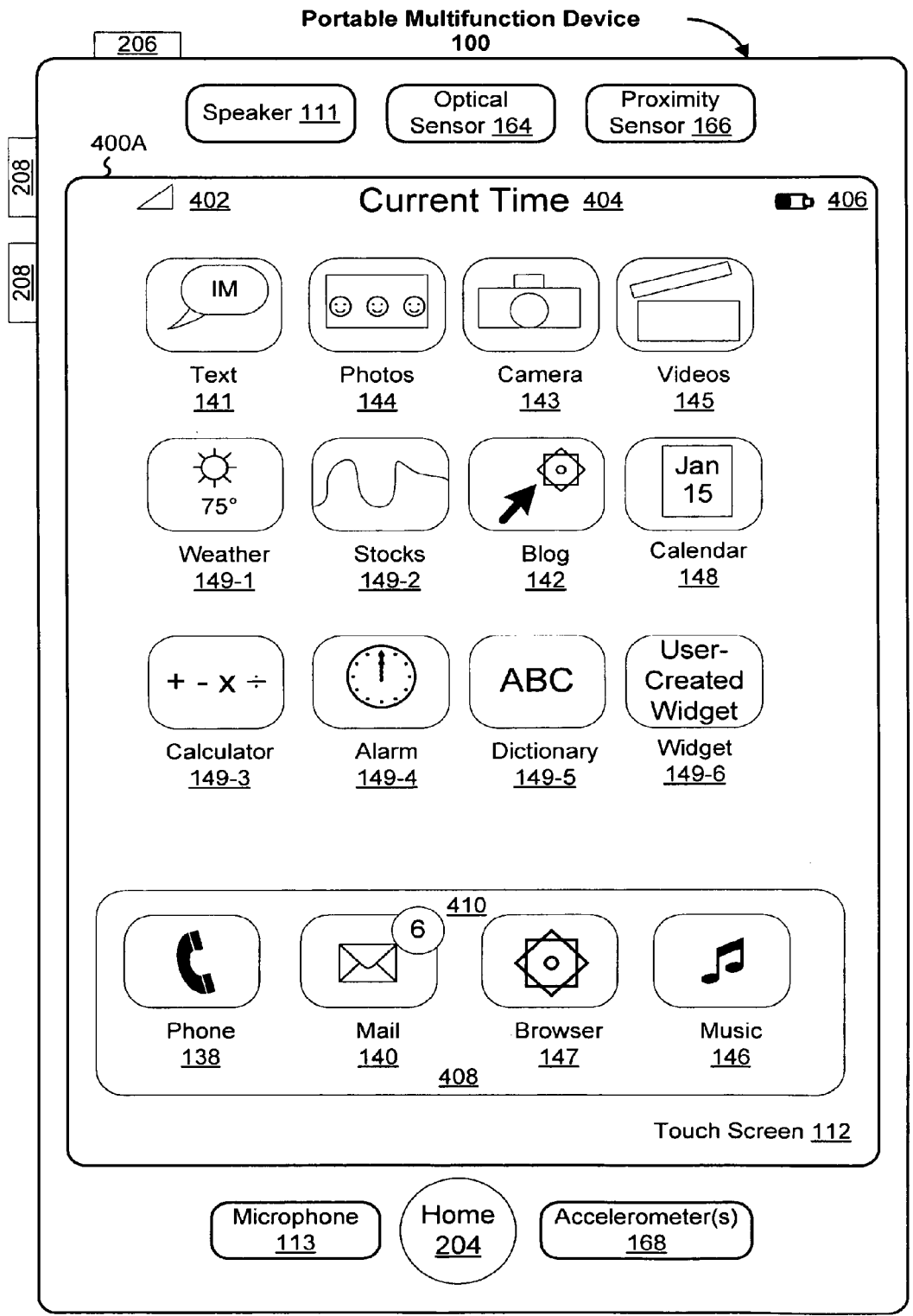
FIGS. 4A and 4B illustrate exemplary user interfaces for a menu of applications on a portable multifunction device in accordance with some embodiments.
Figure 4B:
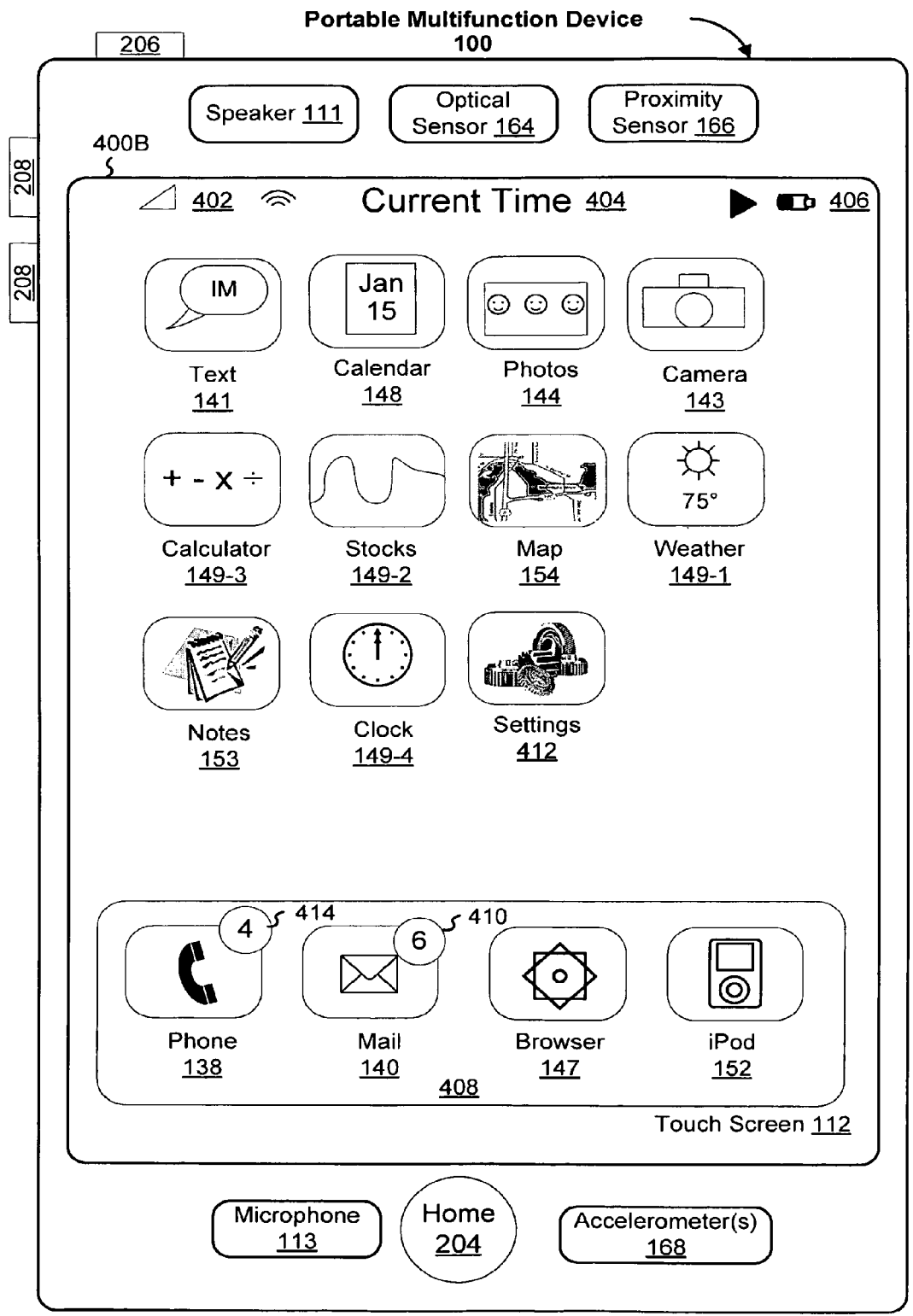

FIGS. 4A and 4B illustrate exemplary user interfaces for a menu of applications on a portable multifunction device in accordance with some embodiments. In some embodiments, user interface 400A includes the following elements, or a subset or superset thereof:
Signal strength indicator(s) 402 for wireless communication(s), such as cellular and Wi-Fi signals;
Time 404;
Battery status indicator 406;
Tray 408 with icons for frequently used applications, such as one or more of the following:
Phone 138, which may include an indicator 414 of the number of missed calls or voicemail messages;
E-mail client 140, which may include an indicator 410 of the number of unread e-mails;
Browser 147; and
Music player 146; and
Icons for other applications, such as one or more of the following:
IM 141;
Image management 144;
Camera 143;
Video player 145;
Weather 149-1;
Stocks 149-2;
Blog 142;
Calendar 148;
Calculator 149-3;
Alarm clock 149-4;
Dictionary 149-5; and
User-created widget 149-6.

In some embodiments, user interface 400B includes the following elements, or a subset or superset thereof:
402, 404, 406, 141, 148, 144, 143, 149-3, 149-2, 149-1, 149-4, 410, 414, 138, 140, and 147, as described above;
Map 154;
Notes 153;
Settings 412, which provides access to settings for the device 100 and its various applications 136; and
Video and music player module 152, also referred to as iPod (trademark of Apple Computer, Inc.) module 152.

In some embodiments, UI 400A or 400B displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400A or 400B provides integrated access to both widget-based applications and non-widget-based applications. In some embodiments, all of the widgets, whether user-created or not, are displayed in UI 400A or 400B. In other embodiments, activating the icon for user-created widget 149-6 may lead to another UI that contains the user-created widgets or icons corresponding to the user-created widgets.

In some embodiments, a user may rearrange the icons in UI 400A or 400B, e.g., using processes described in U.S. patent application Ser. No. 11/459,602, "Portable Electronic Device With Interface Reconfiguration Mode," filed Jul. 24, 2006, which is hereby incorporated by reference herein in its entirety. For example, a user may move application icons in and out of tray 408 using finger gestures.

In some embodiments, UI 400A or 400B includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference herein in its entirety.

As noted above, different types of finger gestures may be used to select and/or interact with UI objects. A finger gesture is comprised of at least a finger-down event and a finger-up event. The finger-down event typically causes a particular UI object to be identified and the finger-up event typically prompts the portable device to perform one or more operations associated with the identified UI object. In some embodiments, one or more finger-dragging events occur after the finger-down event and before the finger-up event. As disclosed herein and described below, different finger gestures may have different definitions for the finger-down event and the finger-up event.

To understand how a pair of finger-down and finger-up events is defined for a particular finger gesture, it is helpful to explain the process of how a finger contacts a touch screen display.

The process of a finger contacting a touch screen display starts with the finger approaching (but not contacting) the touch screen display, which is followed by the finger being in contact with the touch screen display, the finger possibly moving on the touch screen display, the finger being just out of contact with the touch screen display, and the finger moving away from the touch screen display. In some embodiments, a physical parameter is used to track this process. The parameter may be the distance between the finger and the touch screen display, the pressure the finger has on the touch screen display, the contact area between the finger and the touch screen, the voltage between the finger and the touch screen, the capacitance between the finger and the touch screen display, or a function of one or more of physical parameters.

In some embodiments, the portable device repeatedly compares a measurement of the parameter with predefined threshold values and then generates a corresponding finger-related event.

Figures 5A, 5B, 5C, 5D:
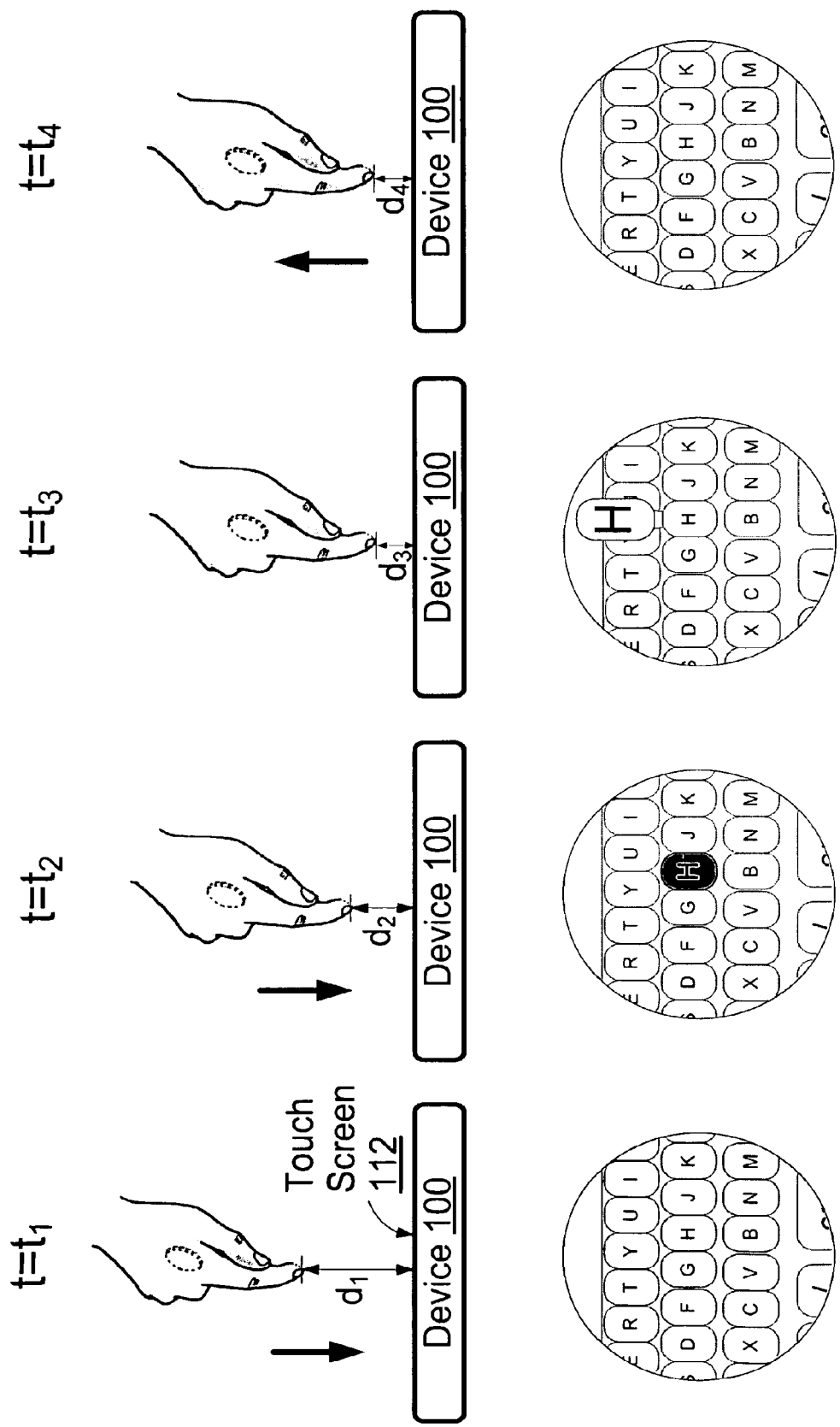
FIGS. 5A through 5E illustrate how a finger tap gesture activates a soft key icon on a touch screen display in accordance with some embodiments.
Figure 5E:
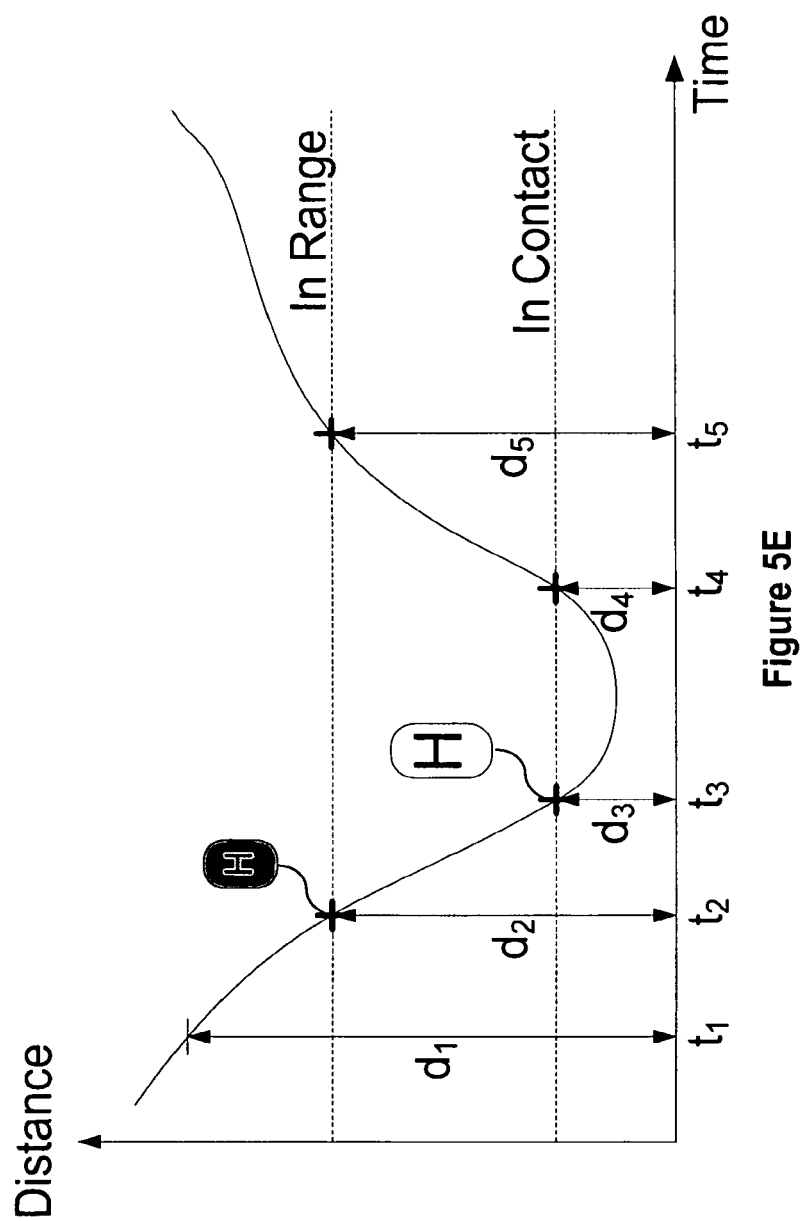

For example, FIG. 5E depicts a distance versus time diagram having two threshold values, "in-range" and "in-contact," and illustrates, in sequence, how a series of finger-related events are generated in association with a finger gesture as represented by the curve in the diagram. (Note that analogous diagrams with analogous threshold values could be drawn for other physical parameters besides distance (e.g., capacitance), but the distance versus time diagram provides a straightforward example.) Initially, a "finger-in-range" event is generated when the parameter value drops below the in-range threshold at $t=t_2$, but is still above the in-contact threshold. A "finger-in-contact" event is then generated when the parameter value drops below the in-contact threshold at $t=t_3$. Next, a "finger-out-of-contact" event is generated when the parameter value exceeds the in-contact threshold at $t=t_4$, but is still below the in-range threshold. Finally, a "finger-out-of-range" event is generated when the parameter value rises above the in-range threshold at $t=t_5$. Between the "finger-in-range" event at $t=t_2$ and the "finger-out-of-range" event at $t=t_5$, zero or more finger-dragging events may be generated to indicate the finger's current position because the finger may be moving across the touch screen display from one position to another position. There may be finger-dragging events when the finger is "in-range" between $(t_2-t_3)$ and between $(t_4-t_5)$, even though the finger is not in contact with the touch screen display as it is between $(t_3-t_4)$.

Thus, a finger gesture may be associated with four distinct events at four different moments: "finger-in-range" at $t_2$; "finger-in-contact" at $t_3$; "finger-out-of-contact" at $t_4$; and "finger-out-of-range" at $t_5$.

In some embodiments, the in-contact threshold corresponds to a parameter such as capacitance between the finger and the touch screen display. It may or may not correlate with the event that the finger is in physical contact with the touch screen. For example, the finger may be deemed in contact with the screen if the capacitance between the two reaches the in-contact threshold while the finger has not physically touched the screen. Alternatively, the finger may be deemed out of contact with (but still in range from) the screen if the capacitance between the two is below the in-contact threshold while the finger has a slight physical contact the screen.

In some embodiments, the finger-down event and the finger-up event in a finger tap gesture are the "finger-in-contact" event at $t_3$ and the "finger-out-of-contact" event at $t_4$, respectively. In some other embodiments, the finger-down event and the finger-up event in a finger tap gesture are based on the "finger-in-range" event at $t_2$ and the "finger-out-of-contact" event at $t_4$, respectively. In either case, the portable device interprets that a corresponding UI object is selected and/or activated by the finger tap gesture after the "finger-out-of-contact" event, but before the "finger-out-of-range" event. Thus, the device performs the operation(s) associated with tap gesture on the UI object more promptly and accurately than if the device treats the "finger-out-of-range" event at $t_5$ as the finger-up event.

FIGS. 5A through 5E illustrate how a finger tap gesture activates a soft key icon on a touch screen display in accordance with some embodiments. Note that the distances between the finger and the touch screen display as shown in FIGS. 5A through 5E are exaggerated for illustrative purposes. For example, the distances $d_3$ and $d_4$ may actually be zero.

At $t=t_1$ (FIG. 5A), a user's finger moves down to a first position that is at a distance $d_1$ from the touch screen display 112 of the device 100. As shown in FIG. 5E, this distance $d_1$ is greater than the "in-range" distance threshold. Therefore, no key icon on the touch screen display gets highlighted.

At $t=t_2$ (FIG. 5B), the finger moves further down to a second position that is at a distance $d_2$ from the touch screen display. As shown in FIG. 5E, this distance $d_2$ is at or slightly below (i.e., within) the "in-range" distance threshold. At this distance, the user's finger is in range of the touch screen display. As a result, a "finger-in-range" event is generated at $t=t_2$ and the key icon (e.g., "H") that is closest to the finger on the touch screen display is highlighted. In some embodiments, an icon is highlighted by altering its color or altering its shape (e.g., magnifying the icon) or both to give an indication to the user of its status change. Note that the fact that the key icon "H" is highlighted does not necessarily indicate that it has been or will be selected because no "finger-out-of-contact" event is detected yet.

At $t=t_3$ (FIG. 5C), the finger moves still closer to the touch screen display and is at a distance $d_3$ from the touch screen display. As shown in FIG. 5E, this distance $d_3$ is at or slightly below the "in-contact" distance threshold. At this distance, the user's finger is in contact with the touch screen display. As a result, a "finger-in-contact" event is generated at $t=t_3$ and the key icon "H" is further highlighted. In some embodiments, the icon is further highlighted by displaying a magnified instance of the icon next to the icon. As shown in FIG. 5C, the magnified instance (which may have an appearance like a balloon) has a visual link with the key icon "H" on the soft keyboard.

At t=$t_4$ (FIG. 5D), the finger is lifted up to a position that is at a distance $d_4$ away from the touch screen display. As shown in FIG. 5E, this distance $d_4$ is at or slightly above the "in-contact" distance threshold. In other words, the finger is just out of contact with the touch screen, but is still in range of the touch screen, and a "finger-out-of-contact" event is generated accordingly at t=$t_4$. As noted above, the "finger-out-of-contact" event marks the completion of a finger tap gesture on a UI object. In other words, the "finger-out-of-contact" event is treated as the finger-up event for a finger tap gesture. The portable device, in response, performs one or more operations associated with the UI object. In this example, the operations include that the key icon "H" is selected and dehighlighted and the character "H" is entered into a field at a predefined location on the touch screen display.

At t=$t_5$ (FIG. 5E), the finger is lifted further away from the touch screen display and a "finger-out-of-range" event is generated when the finger is out of range of the touch screen. Note that because the portable device has already selected the UI object and performed operations in response to the "finger-out-of-contact" event at $t_4$, no further action is taken based on the "finger-out-of-range" event. In other words, because the "finger-out-of-contact" event is treated as the finger-up event for a finger tap gesture, the operations performed in response to detecting the finger tap gesture are performed without regard to the detection of the "finger-out-of-range" event.

In some embodiments, one or more finger-dragging events may be generated between the "finger-in-range" event ($t_2$) and the "finger-out-of-range" event ($t_5$). If the "finger-in-contact" event ($t_3$) is defined as the finger-down event of the finger tap gesture, no finger-dragging event before the "finger-in-contact" event ($t_3$) is deemed to be associated with the finger tap gesture. In contrast, finger-dragging events after the "finger-in-contact" event ($t_3$) and before the "finger-out-of-contact" event ($t_4$) is deemed to be part of the finger tap gesture.

In some embodiments, in response to detecting any finger-dragging event from $t_3$ to $t_4$, the portable device checks whether the finger-dragging event's position is at another UI object other than the key icon "H." If so, the portable device may perform one or more operations accordingly, e.g., highlighting the other UI object and dehighlighting the key icon "H." If the finger is still on or near the key icon "H," the portable device may not perform any operation in response to the finger-dragging event.

In some embodiments (FIG. 6C), the finger-down event and the finger-up event in a finger swipe gesture are the "finger-in-contact" event ($t_3$) and the "finger-out-of-range" event ($t_5$), respectively. In some other embodiments (FIG. 6B), the finger-down event and the finger-up event in a finger swipe gesture are the "finger-in-range" event ($t_2$) and "finger-out-of-range" event ($t_5$), respectively. In either case, the portable device assumes a longer period for the finger swipe gesture than if the finger-up event is the "finger-out-of-contact" event. Thus, the portable device performs more operations associated with the UI object (e.g., more operations corresponding to finger-dragging events), which are more consistent with the user's expectation when applying the finger swipe gesture.

Figure 6A:
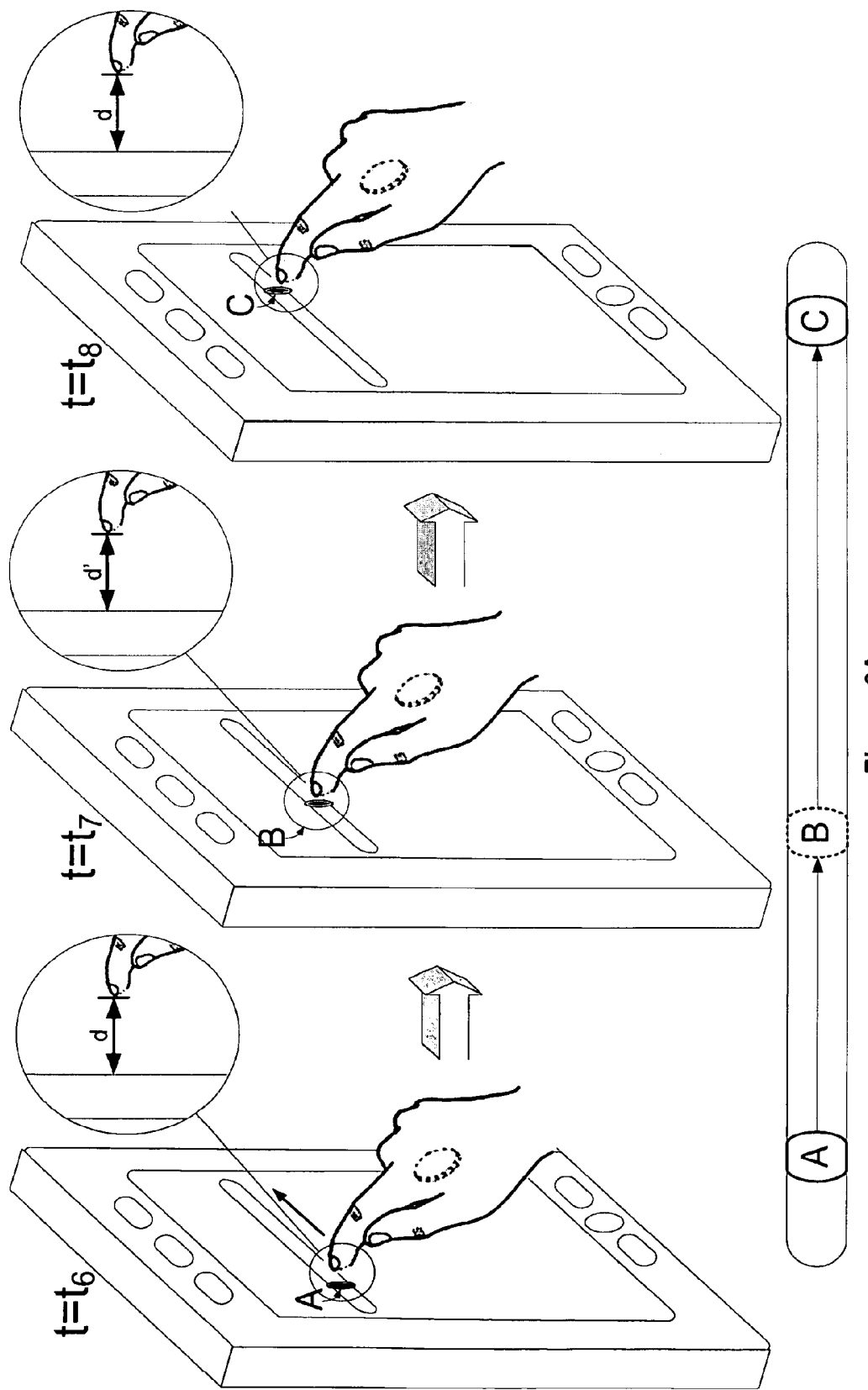
FIGS. 6A through 6C illustrate how a finger swipe gesture controls a slide control icon on a touch screen display in accordance with some embodiments.
Figure 6B:
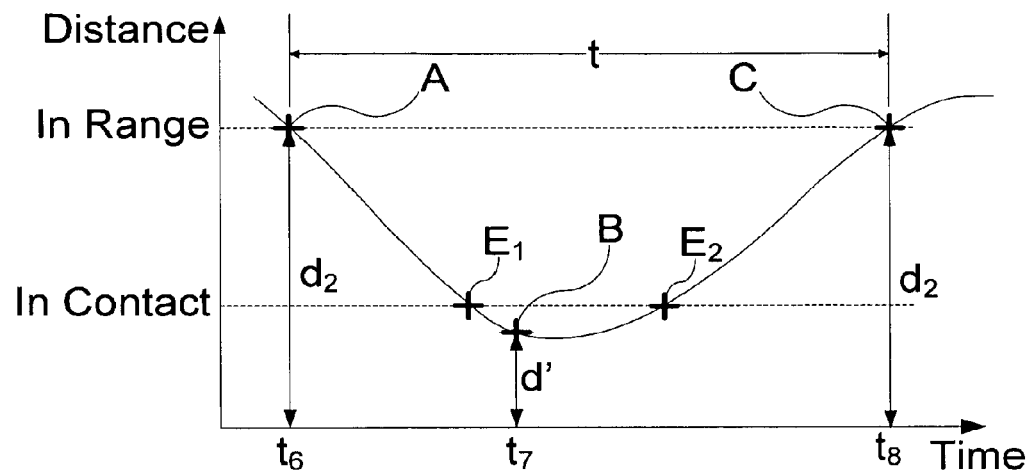
Figure 6C:
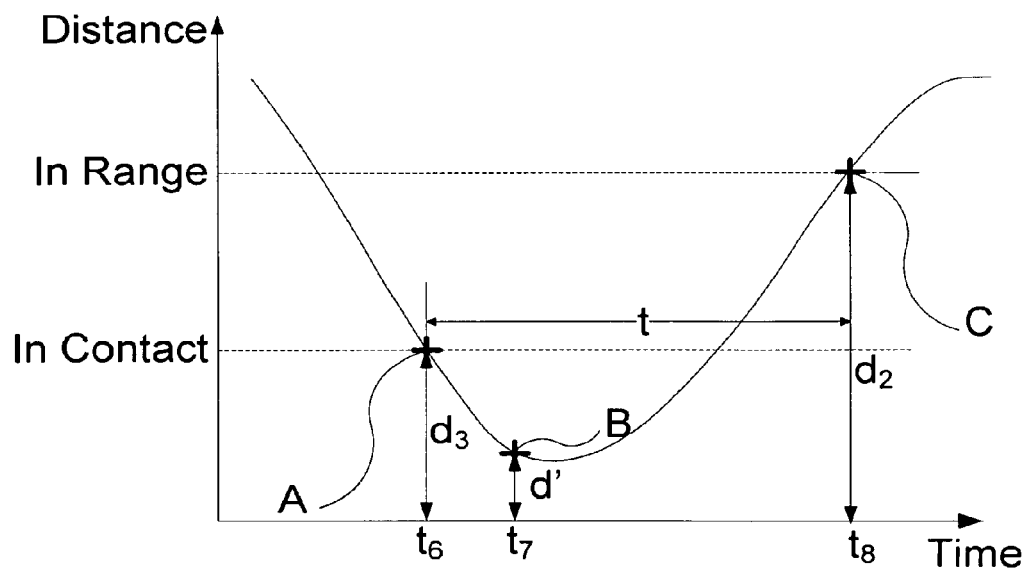

FIGS. 6A through 6C illustrate how a finger swipe gesture controls a slide control icon on a touch screen display in accordance with some embodiments.

At t=$t_6$ (FIG. 6A), the finger is close enough to the touch screen display such that a "finger-in-contact" event (see the cross at position A in FIG. 6C) is detected at a first position A on the touch screen display. A UI object such as a slide control icon is identified at the position A. In some embodiments, the slide control icon is a slide object (displayed on the touch screen display) that can move along a slide bar. The "finger-in-contact" event causes the slide object at position A to be activated. In other words, the "finger-in-contact" event is the finger-down event for the finger swipe gesture.

In some other embodiments, the slide object is activated by a "finger-in-range" event (see the cross at position A in FIG. 6B), not by a "finger-in-contact" event (see the cross at position $E_1$ in FIG. 6B). In other words, the "finger-in-range" event is the finger-down event for the finger swipe gesture.

At t=$t_8$ (FIG. 6A), the finger has moved across the touch screen display until a "finger-out-of-range" event is detected at a second position C on the touch screen display (see, e.g., the crosses at position C in FIGS. 6B and 6C, respectively).

In some embodiments, between the initial finger-down event (i.e., the "finger-in-range" event at position A in FIG. 6B or the "finger-in-contact" event at position A in FIG. 6C) and the finger-up event (i.e., the "finger-out-of-range" event at position C in both FIGS. 6B and 6C), one or more finger-dragging events are detected on or near the touch screen display (e.g., at t=$t_7$ in FIG. 6A), each finger-dragging event having an associated position on the touch screen display. Note that the locations of $t_7$ in FIGS. 6B and 6C are for illustrative purposes.

In the example shown in FIG. 6A, the slide object is dynamically moved along the slide bar from its first position A at $t_6$ to position B at $t_7$. In some embodiments, the position B is determined at least in part by the position on the touch screen display at which the finger-dragging is detected. In response to each finger-dragging event, the portable device moves the slide object along the slide bar from one position to a different position until a "finger-out-of-range" event is detected.

In some embodiments, after the finger-down event is detected (e.g., "finger-in-contact" event at position A in FIG. 6C or "finger-in-range" event at position A in FIG. 6B), the finger can move away from the slide control icon such that the finger is no longer on or near the slide object when the "finger-out-of-range" event occurs. In this case, in response to each finger-dragging event prior to the "finger-out-of-range" event, the slide object is moved along the slide bar from a previous position to a current position that is determined by projecting the finger-dragging event's position onto the slide bar. In some embodiments, the ultimate distance by which the slide object is moved along the slide bar when the "finger-out-of-range" event is detected at a second position is the distance determined by projecting onto the slide bar the path or line between the first position and the second position. In some embodiments, the slide object is moved to a position on the slide bar that is a projection of the second position (i.e., the position on the touch screen display at which the "finger-out-of-range" event occurs) onto the slide bar.

As shown in FIG. 6B, after the initial "finger-in-range" event at A, a "finger-in-contact" event occurs at a subsequent moment (see the cross at $E_1$ in FIG. 6B), which is then followed by a "finger-out-of-contact" event at another moment (see the cross at $E_2$ in FIG. 6B). However, in some embodiments, the slide object is moved in accordance with the "finger-in-range" event at position A and the "finger-out-of-range" event at position C, without regard to the "finger-in-contact" event at $E_1$ and the "finger-out-of-contact" event at $E_2$. As a result, a finger swipe gesture that has never been in contact with the touch screen display may still be able to move a slide object along a slide bar for a certain distance.

In some embodiments (FIG. 6C), the moving distance corresponding to a finger swipe gesture is dependent in part on the position A at which the "finger-in-contact" event occurs and the position C at which the "finger-out-of-range" event is detected.

Note that the distances between the finger and the touch screen display as shown in FIGS. 6A through 6C are exaggerated for illustrative purposes. For example, the distances $d_3$ and d' may actually be zero.

Figure 7:
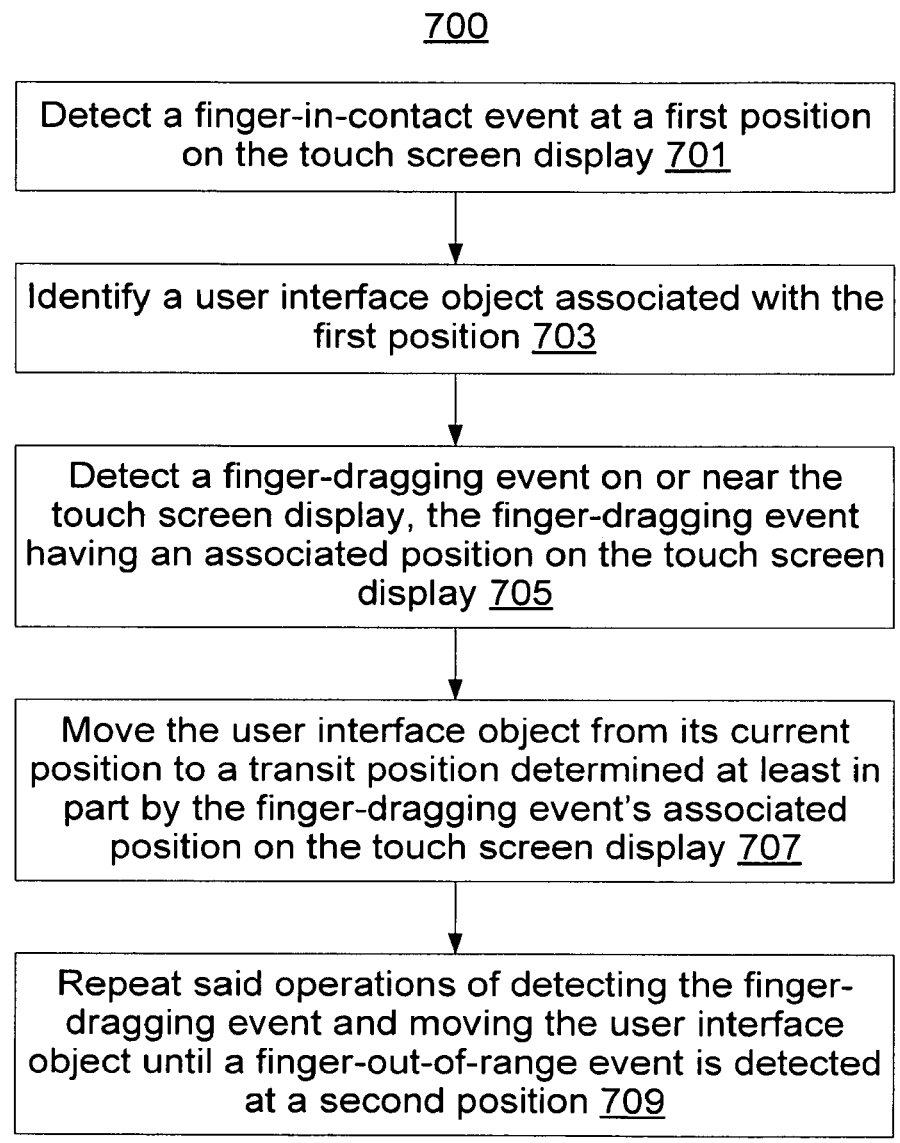
FIG. 7 is a flow diagram illustrating a process for moving a slide control object based on a finger swipe gesture in accordance with some embodiments.

FIG. 7 is a flow diagram illustrating a process 700 for moving a user interface object based on a finger swipe gesture in accordance with some embodiments. By moving a user interface object in accordance with a finger swipe gesture until a finger-out-of range event is detected, rather than stopping the movement when a finger-out-of-contact event is detected, the method provides movement of the user interface object that more accurately reflects the finger swipe gesture.

A portable electronic device has a touch screen display with a plurality of user interface objects on the touch screen. The portable device detects a finger-in-contact event at a first position on the touch screen display (701) (e.g., position A in FIGS. 6A and 6C) and identifies a user interface object associated with the first position (703) (e.g., the slide object at position A in FIG. 6A).

Next, the portable device detects a finger-dragging event on or near the touch screen display (705), the finger-dragging event having an associated position on the touch screen display (e.g., position B in FIGS. 6A and 6C). In response, the portable device moves the user interface object from its current position to a transit position determined at least in part by the finger-dragging event's associated position on the touch screen display (707) (e.g., position B in FIGS. 6A and 6C). The device repeats the operations of detecting the finger-dragging event and moving the user interface object until a finger-out-of-range event is detected at a second position (709) (e.g., position C in FIGS. 6A and 6C).

In some embodiments, the user interface object is a slide object that is moveable along a slide bar (see, e.g., FIG. 6A). In response to detecting a finger-dragging event, the portable device moves the slide object along the slide bar from its current position to a transit position determined at least in part by a projection of the finger-dragging event's associated position on the touch screen display onto the slide bar. The second position is also on the slide bar and the slide object is ultimately moved to the second position (see, e.g., position C in FIG. 6A). The slide object is moved along the slide bar by no more than a distance between the transit position and the current position (see, e.g., FIG. 6A).

In some embodiments, the finger-dragging event's associated position is off the slide bar and the slide object is moved along the slide bar to the transit position that is at least in part determined by a projection of the finger-dragging event's associated position onto the slide bar.

In some embodiments, the user interface object is moved by a predefined distance in a predefined direction on the touch screen display in accordance with the distance between the transit position and the current position and the direction from the current position to the transit position, respectively. See, e.g., FIG. 6A. The predefined direction is substantially the same as the direction from the current position to the transit position.

In some embodiments, the transit position of the UI object is exclusively determined by the finger-dragging event's associated position on the touch screen display.

As noted above, when finger gestures are applied to the touch screen display, some gestures are interpreted as finger tap gestures on some types of UI object (see, e.g., FIGS. 5A through 5E) and other gestures are interpreted as finger swipe gestures on other types of UI objects (see, e.g., FIGS. 6A through 6C). In response to the different types of finger gestures, the portable device performs different sets of operations.

Figure 8:
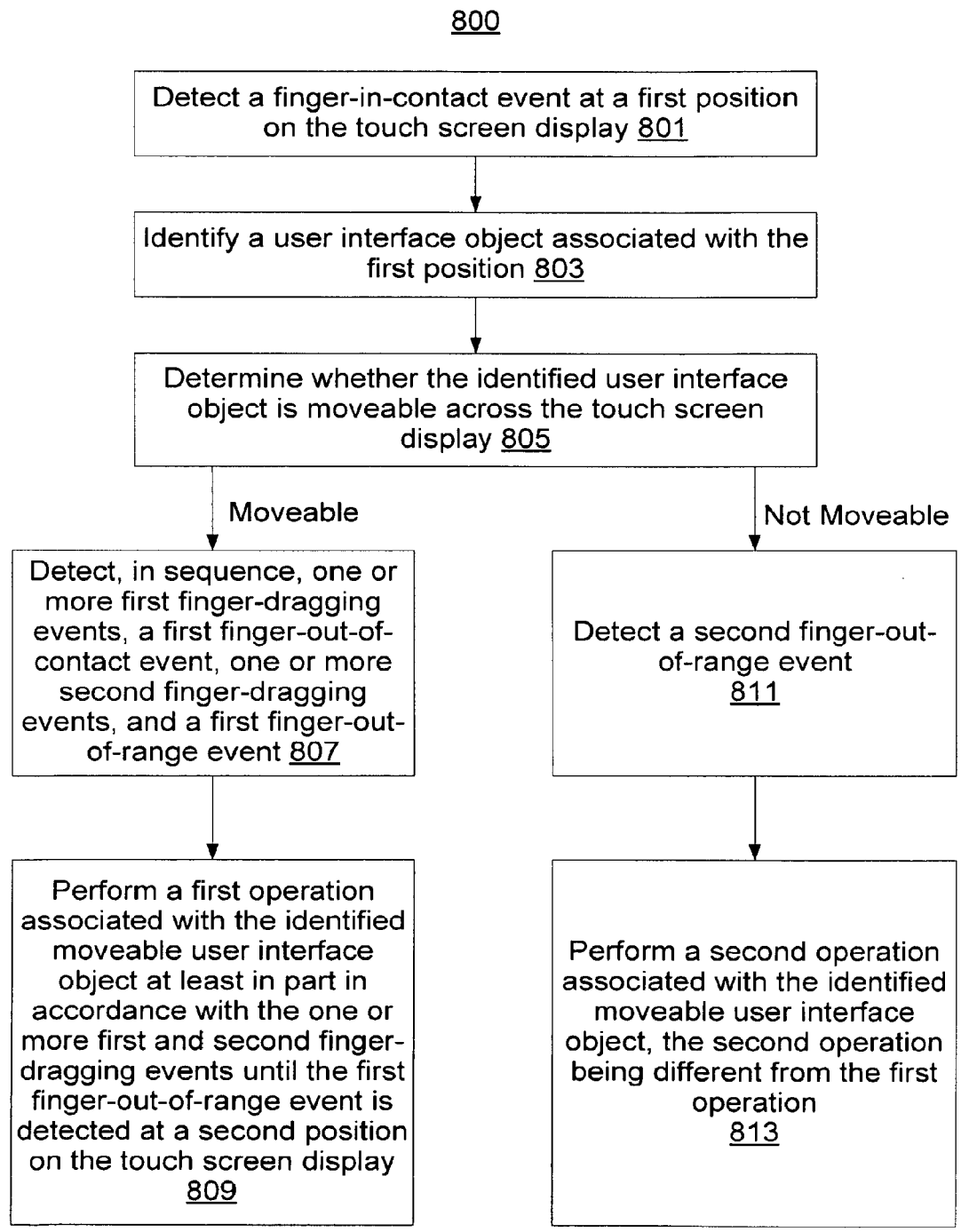
FIG. 8 is a flow diagram illustrating a process for interpreting a finger gesture and performing one or more corresponding operations in accordance with some embodiments.

FIG. 8 is a flow diagram illustrating a process 800 for interpreting a finger gesture and performing one or more corresponding operations in accordance with some embodiments. By using a finger-out-of range event as the finger-up event for a finger swipe gesture on a moveable UI object and a finger-out-of-contact event as the finger-up event for a finger gesture (e.g., a tap gesture) on an immoveable UI object, the method provides portable devices with touch screen displays that respond more accurately and efficiently to touch input by a user.

A portable electronic device (e.g., 100) has a touch screen display 112 with a plurality of user interface objects on the touch screen display. The portable device detects a finger-in-contact event at a first position on the touch screen display (801) and identifies a user interface object associated with the first position (803) (e.g., the key icon "H" in FIG. 5C or the slide object on the slide bar in FIG. 6A).

Next, the portable device determines whether the identified user interface object is moveable across the touch screen display (805). For example, the key icon "H" in FIG. 5C is not moveable, but the slide object on the slide bar in FIG. 6A is moveable.

For an identified user interface object that is determined to be moveable across the touch screen display, the portable device detects, in sequence, one or more first finger-dragging events, a first finger-out-of-contact event, one or more second finger-dragging events, and a first finger-out-of-range event (807) (see, e.g., FIG. 6C between $t_6$ and $t_8$).

In response to detecting the one or more first and second finger-dragging events on or near the touch screen display after determining the identified user interface object is moveable, the portable device performs a first operation associated with the identified moveable user interface object at least in part in accordance with the one or more first and second finger-dragging events until the first finger-out-of-range event is detected at a second position on the touch screen display (809) (see, e.g., at position C in FIGS. 6A and 6C).

In some embodiments, the identified moveable user interface object is a slide object that is moveable along a slide bar (see, e.g., the slide object at positions A, B, and C in FIG. 6A). The portable device performs the first operation by moving the slide object along the slide bar from its current position to a transit position determined at least in part by a projection of each of the one or more first and second finger-dragging events' associated positions on the touch screen display onto the slide bar. In some embodiments, at least one of the associated positions is off the slide bar and the slide object is moved along the slide bar to the transit position that is at least in part determined by a projection of the associated position onto the slide bar.

In some embodiments, the identified moveable user interface object is a list of information items. The portable device performs the first operation by scrolling the list of information items vertically from the first position to the second position such that at least one information item in the list disappears from the touch screen display.

In some embodiments, the identified moveable user interface object is a digital image. The portable device performs the first operation by translating the digital image in a diagonal direction defined at least in part by the direction determined by the first position and the second position.

For an identified user interface object that is determined to be not moveable across the touch screen display, the portable device detects a second finger-out-of-contact event (811) (see, e.g., the cross at t₄ in FIG. 5E). In response to detecting the second finger-out-of-contact event after determining the identified user interface object is not moveable, the portable device performs a second operation, different from the first operation (813) (see, e.g., FIG. 5D). In some embodiments, the portable device detects a second finger-out-of-range event after the second finger-out-of-contact event is detected (see, e.g., the cross at t₅ in FIG. 5E) and performs the second operation in response to detecting the second finger-out-of-contact event without regard to the detection of the second finger-out-of-range event.

In some embodiments, the identified immoveable user interface object is an alphanumeric key icon. The portable device performs the second operation by entering a character corresponding to the alphanumeric key icon at a predefined location on the touch screen display.

In some embodiments, the identified immoveable user interface object includes a virtual pushbutton for sending a composed message. The portable device performs the second operation by sending the composed message to a user-specified recipient address.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
   at a portable electronic device with a touch screen display with a plurality of user interface objects:
   detecting a finger-in-range event at a first position on the touch screen display, wherein the finger-in-range event indicates that a vertical displacement parameter for a respective finger satisfies a first threshold parameter value, the vertical displacement parameter indicating a degree of closeness between the respective finger and the touch screen display;
   after detecting the finger-in-range event at the first position, identifying among the plurality of user interface objects a user interface object associated with the first position;
   in accordance with a determination that the identified user interface object is moveable across the touch screen display:
   detecting, in sequence, a finger-in-contact event, one or more first finger-dragging events, a first finger-out-of-contact event, one or more second finger-dragging events, and a first finger-out-of-range event;
   in response to detecting the one or more first finger-dragging events after determining the identified user interface object is moveable, performing a first operation associated with the identified moveable user interface object at least in part in accordance with the one or more first finger-dragging events; and
   in response to detecting the one or more second finger-dragging events, continuing to perform the first operation associated with the identified moveable user interface object at least in part in accordance with the one or more second finger-dragging events until the first finger-out-of-range event is detected at a second position on the touch screen display, wherein the finger-out-of-range event indicates that the vertical displacement parameter for the respective finger does not satisfy the first threshold parameter value; and
   in accordance with a determination that the identified user interface object is not moveable across the touch screen display:
   detecting a second finger-out-of-contact event, wherein the second finger-out-of-contact event indicates the vertical displacement parameter for the respective finger does not satisfy a second threshold parameter value distinct from the first threshold parameter value; and
   in response to detecting the second finger-out-of-contact event after determining the identified user interface object is not moveable, performing a second operation, different from the first operation.

2. The method of claim 1, wherein the user interface object comprises a slide object that is moveable along a slide bar, wherein said step of determining the user interface object is movable further comprises:
   moving the slide object along the slide bar from its current position to a transit position determined at least in part by a projection of the finger-in-range event's first position on the touch screen display onto the slide bar.

3. The method of claim 2, wherein the second position is on the slide bar and the slide object is moved to the second position.

4. The method of claim 2, wherein the slide object is moved along the slide bar by no more than a distance between the transit position and the current position.

5. The method of claim 2, wherein the first position is off the slide bar and the slide object is moved along the slide bar to the transit position that is at least in part determined by a projection of the first position onto the slide bar.

6. The method of claim 1, wherein the user interface object is moved by a predefined distance in a predefined direction on the touch screen display in accordance with the distance between a transit position and a current position and the direction from the current position to the transit position, respectively.

7. The method of claim 6, wherein the predefined direction is substantially the same as the direction from the current position to the transit position.

8. The method of claim 2, wherein the transit position is exclusively determined by the finger-in-range event's first position on the touch screen display.

9. A computer-implemented method, comprising:
   at a portable electronic device with a touch screen display with a plurality of user interface objects:
   detecting a finger-in-range event at a first position on the touch screen display, wherein the finger-in-range event indicates that a vertical displacement parameter for a respective finger satisfies a first threshold parameter value, the vertical displacement parameter indicating a degree of closeness between the respective finger and the touch screen display;
   after detecting the finger-in-range event at the first position, identifying among the plurality of user interface objects a user interface object associated with the first position, the user interface object comprising a slide object that is moveable along a slide bar;

in accordance with a determination that the identified user interface object is moveable across the touch screen display:
    detecting, in sequence, a finger-in-contact event, one or more first finger-dragging events, a first finger-out-of-contact event, one or more second finger-dragging events, and a first finger-out-of-range event;
    in response to detecting the one or more first finger-dragging events after determining the identified user interface object is moveable, performing a first operation associated with the identified moveable user interface object at least in part in accordance with the one or more first finger-dragging events; and
    in response to detecting the one or more second finger-dragging events, continuing to perform the first operation associated with the identified moveable user interface object at least in part in accordance with the one or more second finger-dragging events until the first finger-out-of-range event is detected at a second position on the touch screen display, wherein the finger-out-of-range event indicates that the vertical displacement parameter for the respective finger does not satisfy the first threshold parameter value; and
in accordance with a determination that the identified user interface object is not moveable across the touch screen display:
    detecting a second finger-out-of-contact event, wherein the second finger-out-of-contact event indicates the vertical displacement parameter for the respective finger does not satisfy a second threshold parameter value distinct from the first threshold parameter value; and
    in response to detecting the second finger-out-of-contact event after determining the identified user interface object is not moveable, performing a second operation, different from the first operation.

10. The method of claim 9, wherein the second position is on the slide bar and the slide object is moved to the second position.

11. The method of claim 9, wherein said step of determining the slide object is moveable along the slide bar further comprises:
    moving the slide object along the slide bar from its current position to a transit position determined at least in part by a projection of the finger-in-range event's first position onto the slide bar.

12. The method of claim 11, wherein the slide object is moved along the slide bar by no more than a distance between the transit position and the current position.

13. The method of claim 9, wherein the first position is off the slide bar and the slide object is moved along the slide bar to a transit position that is at least in part determined by a projection of the first position onto the slide bar.

14. A graphical user interface on a portable electronic device with a touch screen display, comprising:
a plurality of user interface objects;
wherein:
    a finger-in-range event at a first position on the touch screen display is detected, wherein the finger-in-range event indicates that a vertical displacement parameter for a respective finger satisfies a first threshold parameter value, the vertical displacement parameter indicating a degree of closeness between the respective finger and the touch screen display;
    a user interface object, among the plurality of user interface objects, associated with the first position is identified;
    in accordance with a determination that the identified user interface object is moveable across the touch screen display:
        detecting, in sequence, a finger-in-contact event, one or more first finger-dragging events, a first finger-out-of-contact event, one or more second finger-dragging events, and a first finger-out-of-range event;
        in response to detecting the one or more first finger-dragging events after determining the identified user interface object is moveable, performing a first operation associated with the identified moveable user interface object at least in part in accordance with the one or more first finger-dragging events; and
        in response to detecting the one or more second finger-dragging events, continuing to perform the first operation associated with the identified moveable user interface object at least in part in accordance with the one or more second finger-dragging events until the first finger-out-of-range event is detected at a second position on the touch screen display, wherein the finger-out-of-range event indicates that the vertical displacement parameter for the respective finger does not satisfy the first threshold parameter value; and
    in accordance with a determination that the identified user interface object is not moveable across the touch screen display:
        detecting a second finger-out-of-contact event, wherein the second finger-out-of-contact event indicates the vertical displacement parameter for the respective finger does not satisfy a second threshold parameter value distinct from the first threshold parameter value; and
        in response to detecting the second finger-out-of-contact event after determining the identified user interface object is not moveable, performing a second operation, different from the first operation.

15. A portable electronic device, comprising:
a touch screen display with a plurality of user interface objects;
one or more processors;
memory; and
one or more programs, wherein the one or more programs are stored in the memory and configured to be executed by the one or more processors, the one or more programs including instructions for:
    detecting a finger-in-range event at a first position on the touch screen display, wherein the finger-in-range event indicates that a vertical displacement parameter for a respective finger satisfies a first threshold parameter value, the vertical displacement parameter indicating a degree of closeness between the respective finger and the touch screen display;
    after detecting the finger-in-range event at the first position, identifying among the plurality of user interface objects a user interface object associated with the first position;
    in accordance with a determination that the identified user interface object is moveable across the touch screen display:
        detecting, in sequence, a finger-in-contact event, one or more first finger-dragging events, a first fingerout-of-contact event, one or more second finger-dragging events, and a first finger-out-of-range event;

in response to detecting the one or more first finger-dragging events after determining the identified user interface object is moveable, performing a first operation associated with the identified moveable user interface object at least in part in accordance with the one or more first finger-dragging events; and in response to detecting the one or more second finger-dragging events, continuing to perform the first operation associated with the identified moveable user interface object at least in part in accordance with the one or more second finger-dragging events until the first finger-out-of-range event is detected at a second position on the touch screen display, wherein the finger-out-of-range event indicates that the vertical displacement parameter for the respective finger does not satisfy the first threshold parameter value; and in accordance with a determination that the identified user interface object is not moveable across the touch screen display:

detecting a second finger-out-of-contact event, wherein the second finger-out-of-contact event indicates the vertical displacement parameter for the respective finger does not satisfy a second threshold parameter value distinct from the first threshold parameter value; and in response to detecting the second finger-out-of-contact event after determining the identified user interface object is not moveable, performing a second operation, different from the first operation.

16. A non-transitory computer readable storage medium that stores one or more programs, the one or more programs including instructions that, when executed by a portable electronic device with a touch screen display, cause the device to:

detect a finger-in-range event at a first position on the touch screen display, wherein the finger-in-range event indicates that a vertical displacement parameter for a respective finger satisfies a first threshold parameter value, the vertical displacement parameter indicating a degree of closeness between the respective finger and the touch screen display;

after detecting the finger-in-range event at the first position, identify among the plurality of user interface objects a user interface object associated with the first position;

in accordance with a determination that the identified user interface object is moveable across the touch screen display:

detect, in sequence, a finger-in-contact event, one or more first finger-dragging events, a first finger-out-of-contact event, one or more second finger-dragging events, and a first finger-out-of-range event;

in response to detecting the one or more first finger-dragging events after determining the identified user interface object is moveable, performing a first operation associated with the identified moveable user interface object at least in part in accordance with the one or more first finger-dragging events; and in response to detecting the one or more second finger-dragging events, continuing to perform the first operation associated with the identified moveable user interface object at least in part in accordance with the one or more second finger-dragging events until the first finger-out-of-range event is detected at a second position on the touch screen display, wherein the finger-out-of-range event indicates that the vertical displacement parameter for the respective finger does not satisfy the first threshold parameter value; and in accordance with a determination that the identified user interface object is not moveable across the touch screen display:

detecting a second finger-out-of-contact event, wherein the second finger-out-of-contact event indicates the vertical displacement parameter for the respective finger does not satisfy a second threshold parameter value distinct from the first threshold parameter value; and in response to detecting the second finger-out-of-contact event after determining the identified user interface object is not moveable, performing a second operation, different from the first operation.

17. A computer-implemented method, comprising:

at a portable electronic device with a touch screen display with a plurality of user interface objects:

detecting a finger-in-range event at a first position on the touch screen display, wherein the finger-in-range event indicates that a vertical displacement parameter for a respective finger satisfies a first threshold parameter value, the vertical displacement parameter indicating a degree of closeness between the respective finger and the touch screen display;

after detecting the finger-in-range event at the first position, identifying among the plurality of user interface objects a user interface object associated with the first position;

in accordance with a determination that the identified user interface object is moveable across the touch screen display:

detecting, in sequence, a finger-in-contact event, one or more first finger-dragging events, a first finger-out-of-contact event, one or more second finger-dragging events, and a first finger-out-of-range event;

in response to detecting the one or more first finger-dragging events after determining the identified user interface object is moveable, performing a first operation associated with the identified moveable user interface object at least in part in accordance with the one or more first finger-dragging events; and in response to detecting the one or more second finger-dragging events, continuing to perform the first operation associated with the identified moveable user interface object at least in part in accordance with the one or more second finger-dragging events until the first finger-out-of-range event is detected at a second position on the touch screen display; and in accordance with a determination that the identified user interface object is not moveable across the touch screen display:

detecting a second finger-out-of-contact event; and in response to detecting the second finger-out-of-contact event after determining the identified user interface object is not moveable, performing a second operation, different from the first operation.

18. The method of claim 17, wherein the identified moveable user interface object includes a slide object that is moveable along a slide bar, wherein said step of performing the first operation further comprises:

moving the slide object along the slide bar from its current position to a transit position determined at least in part by a projection of each of the one or more first and second finger-dragging events' associated positions on the touch screen display onto the slide bar.

19. The method of claim 18, wherein at least one of the associated positions is off the slide bar and the slide object is moved along the slide bar to the transit position that is at least in part determined by a projection of the associated position onto the slide bar.

20. The method of claim 17, wherein the identified moveable user interface object includes a list of information items, wherein said step of performing the first operation further comprises:
    scrolling the list of information items vertically from the first position to the second position such that at least one information item in the list disappears from the touch screen display.

21. The method of claim 17, wherein the identified moveable user interface object includes a digital image, wherein said step of performing the first operation further comprises:
    translating the digital image in a diagonal direction defined at least in part by the direction determined by the first position and the second position.

22. The method of claim 17, further comprising:
    for the identified user interface object that is determined to be not moveable across the touch screen display:
        detecting a second finger-out-of-range event after the second finger-out-of-contact event is detected; and
        performing the second operation in response to detecting the second finger-out-of-contact event without regard to the detection of the second finger-out-of-range event.

23. The method of claim 17, wherein the identified not-moveable user interface object includes an alphanumeric key icon, wherein said step of performing the second operation further comprises:
    entering a character corresponding to the alphanumeric key icon at a predefined location on the touch screen display.

24. The method of claim 17, wherein the identified not-moveable user interface object includes a virtual pushbutton for sending a composed message, wherein said step of performing the second operation further comprises:
    sending the composed message to a user-specified recipient address.

25. A graphical user interface on a portable electronic device with a touch screen display, comprising:
    a plurality of user interface objects;
    wherein:
        a finger-in-contact event at a first position on the touch screen display is detected;
        a user interface object associated with the first position is identified;
        a determination is made whether the identified user interface object is moveable across the touch screen display;
        for an identified user interface object that is determined to be moveable across the touch screen display:
            a sequence of finger-related events, including one or more first finger-dragging events, a first finger-out-of-contact event, one or more second finger-dragging events, and a first finger-out-of-range event, are detected;
            in response to detecting the one or more first finger-dragging events after determining the identified user interface object is moveable, a first operation associated with the identified moveable user interface object is performed at least in part in accordance with the one or more first finger-dragging events; and
            in response to detecting the one or more second finger-dragging events, the first operation associated with the identified moveable user interface object continues to be performed at least in part in accordance with the one or more second finger-dragging events until the first finger-out-of-range event is detected at a second position on the touch screen display; and
        for an identified user interface object that is determined to be not moveable across the touch screen display:
            a second finger-out-of-contact event is detected; and
            in response to detecting the second finger-out-of-contact event after determining the identified user interface object is not moveable, a second operation, different from the first operation, is performed.

26. A portable electronic device, comprising:
    a touch screen display with a plurality of user interface objects;
    one or more processors;
    memory; and
    one or more programs, wherein the one or more programs are stored in the memory and configured to be executed by the one or more processors, the one or more programs including instructions for:
        detecting a finger-in-contact event at a first position on the touch screen display;
        identifying among the plurality of user interface objects a user interface object associated with the first position;
        determining whether the identified user interface object is moveable across the touch screen display;
        for an identified user interface object that is determined to be moveable across the touch screen display:
            detecting, in sequence, one or more first finger-dragging events, a first finger-out-of-contact event, one or more second finger-dragging events, and a first finger-out-of-range event;
            performing a first operation associated with the identified moveable user interface object at least in part in accordance with the one or more first finger-dragging events in response to detecting the one or more first finger-dragging events after determining the identified user interface object is moveable; and
            continuing to perform the first operation associated with the identified moveable user interface object at least in part in accordance with the one or more second finger-dragging events until the first finger-out-of-range event is detected at a second position on the touch screen display in response to detecting the one or more second finger-dragging events; and
        for an identified user interface object that is determined to be not moveable across the touch screen display:
            detecting a second finger-out-of-contact event; and
            performing a second operation, different from the first operation in response to detecting the second finger-out-of-contact event after determining the identified user interface object is not moveable.

27. A non-transitory computer readable storage medium that stores one or more programs, the one or more programs including instructions that, when executed by a portable electronic device having a touch screen display, cause the device to:
    detect a finger-in-contact event at a first position on the touch screen display;
    identify among the plurality of user interface objects a user interface object associated with the first position;

determine whether the identified user interface object is moveable across the touch screen display;

for an identified user interface object that is determined to be moveable across the touch screen display:
  detect, in sequence, one or more first finger-dragging events, a first finger-out-of-contact event, one or more second finger-dragging events, and a first finger-out-of range event;
  in response to detecting the one or more first finger-dragging events on or near the touch screen display after determining the identified user interface object is moveable, perform a first operation associated with the identified moveable user interface object at least in part in accordance with the one or more first finger-dragging events; and
  in response to detecting the one or more second finger-dragging events on or near the touch screen display, continue to perform the first operation associated with the identified moveable user interface object at least in part in accordance with the one or more second finger-dragging events until the first finger-out-of-range event is detected at a second position on the touch screen display; and for an identified user interface object that is determined to be not moveable across the touch screen display:
  detect a second finger-out-of-contact event; and
  in response to detecting the second finger-out-of-contact event after determining the identified user interface object is not moveable, perform a second operation, different from the first operation.

28. A method, comprising:
at a portable electronic device with a touch screen display with a plurality of user interface objects:
  detecting a finger-in-contact event at a first position on the touch screen display, wherein the finger-in-contact event indicates that a vertical displacement parameter for a respective finger satisfies a first threshold parameter value, the vertical displacement parameter indicating a degree of closeness between the respective finger and the touch screen display;
  identifying among the plurality of user interface objects a user interface object associated with the first position;
  determining whether the identified user interface object is moveable across the touch screen display;
  in accordance with a determination that the identified user interface object is moveable across the touch screen display:
    detecting, in sequence, one or more first finger-dragging events, a first finger-out-of-contact event, one or more second finger-dragging events, and a first finger-out-of-range event;
    in response to detecting the one or more first finger-dragging events after determining the identified user interface object is moveable, performing a first operation associated with the identified moveable user interface object at least in part in accordance with the one or more first finger-dragging events; and
    in response to detecting the one or more second finger-dragging events, continuing to perform the first operation associated with the identified moveable user interface object at least in part in accordance with the one or more second finger-dragging events until the first finger-out-of-range event is detected at a second position on the touch screen display, wherein the finger-out-of-range event indicates that the vertical displacement parameter for the respective finger does not satisfy a second threshold parameter value distinct from the first threshold parameter value; and
  in accordance with a determination that the identified user interface object is not moveable across the touch screen display:
    detecting a second finger-out-of-contact event; and
    in response to detecting the second finger-out-of-contact event after determining the identified user interface object is not moveable, performing a second operation, different from the first operation.

29. The method of claim 28, wherein the identified moveable user interface object includes a slide object that is moveable along a slide bar, wherein said step of performing the first operation further comprises:
  moving the slide object along the slide bar from its current position to a transit position determined at least in part by a projection of each of the one or more first and second finger-dragging events' associated positions on the touch screen display onto the slide bar.

30. The method of claim 29, wherein at least one of the associated positions is off the slide bar and the slide object is moved along the slide bar to the transit position that is at least in part determined by a projection of the associated position onto the slide bar.

31. The method of claim 28, further comprising:
for the identified user interface object that is determined to be not moveable across the touch screen display:
  detecting a second finger-out-of-range event after the second finger-out-of-contact event is detected; and
  performing the second operation in response to detecting the second finger-out-of-contact event without regard to the detection of the second finger-out-of-range event.

32. A graphical user interface on a portable electronic device with a touch screen display, comprising:
a plurality of user interface objects;
wherein:
  a finger-in-contact event at a first position on the touch screen display is detected, wherein the finger-in-contact event indicates that a vertical displacement parameter for a respective finger satisfies a first threshold parameter value, the vertical displacement parameter indicating a degree of closeness between the respective finger and the touch screen display;
  a user interface object associated with the first position is identified;
  a determination is made whether the identified user interface object is moveable across the touch screen display;
  in accordance with a determination that the identified user interface object is moveable across the touch screen display:
    a sequence of finger-related events, including one or more first finger-dragging events, a first finger-out-of-contact event, one or more second finger-dragging events, and a first finger-out-of-range event, are detected;
    in response to detecting the one or more first finger-dragging events after determining the identified user interface object is moveable, a first operation associated with the identified moveable user interface object is performed at least in part in accordance with the one or more first finger-dragging events; and in response to detecting the one or more second finger-dragging events, the first operation associated with the identified moveable user interface object continues to be performed at least in part in accordance with the one or more second finger-dragging events until the first finger-out-of-range event is detected at a second position on the touch screen display, wherein the finger-out-of-range event indicates that the vertical displacement parameter for the respective finger does not satisfy a second threshold parameter value distinct from the first threshold parameter value; and in accordance with a determination that the identified user interface object is not moveable across the touch screen display:
a second finger-out-of-contact event is detected; and
in response to detecting the second finger-out-of-contact event after determining the identified user interface object is not moveable, a second operation, different from the first operation, is performed.

33. A portable electronic device, comprising:
a touch screen display with a plurality of user interface objects;
one or more processors;
memory; and
one or more programs, wherein the one or more programs are stored in the memory and configured to be executed by the one or more processors, the one or more programs including instructions for:
detecting a finger-in-contact event at a first position on the touch screen display, wherein the finger-in-contact event indicates that a vertical displacement parameter for a respective finger satisfies a first threshold parameter value, the vertical displacement parameter indicating a degree of closeness between the respective finger and the touch screen display;
identifying among the plurality of user interface objects a user interface object associated with the first position;
determining whether the identified user interface object is moveable across the touch screen display;
in accordance with a determination that the identified user interface object is moveable across the touch screen display:
detecting, in sequence, one or more first finger-dragging events, a first finger-out-of-contact event, one or more second finger-dragging events, and a first finger-out-of-range event;
performing a first operation associated with the identified moveable user interface object at least in part in accordance with the one or more first finger-dragging events in response to detecting the one or more first finger-dragging events after determining the identified user interface object is moveable; and
continuing to perform the first operation associated with the identified moveable user interface object at least in part in accordance with the one or more second finger-dragging events until the first finger-out-of-range event is detected at a second position on the touch screen display in response to detecting the one or more second finger-dragging events, wherein the finger-out-of-range event indicates that the vertical displacement parameter for the respective finger does not satisfy a second threshold parameter value distinct from the first threshold parameter value; and in accordance with a determination that the identified user interface object is not moveable across the touch screen display:
detecting a second finger-out-of-contact event; and
performing a second operation, different from the first operation in response to detecting the second finger-out-of-contact event after determining the identified user interface object is not moveable.

34. A non-transitory computer readable storage medium that stores one or more programs, the one or more programs including instructions that, when executed by a portable electronic device having a touch screen display, cause the device to:
detect a finger-in-contact event at a first position on the touch screen display, wherein the finger-in-contact event indicates that a vertical displacement parameter for a respective finger satisfies a first threshold parameter value, the vertical displacement parameter indicating a degree of closeness between the respective finger and the touch screen display;
identify among the plurality of user interface objects a user interface object associated with the first position;
determine whether the identified user interface object is moveable across the touch screen display;
in accordance with a determination that the identified user interface object is-moveable across the touch screen display:
detect, in sequence, one or more first finger-dragging events, a first finger-out-of-contact event, one or more second finger-dragging events, and a first finger-out-of-range event;
in response to detecting the one or more first finger-dragging events after determining the identified user interface object is moveable, perform a first operation associated with the identified moveable user interface object at least in part in accordance with the one or more first finger-dragging events; and
in response to detecting the one or more second finger-dragging events, continue to perform the first operation associated with the identified moveable user interface object at least in part in accordance with the one or more second finger-dragging events until the first finger-out-of-range event is detected at a second position on the touch screen display, wherein the finger-out-of-range event indicates that the vertical displacement parameter for the respective finger does not satisfy a second threshold parameter value distinct from the first threshold parameter value; and
in accordance with a determination that the identified user interface object is not moveable across the touch screen display:
detect a second finger-out-of-contact event; and
in response to detecting the second finger-out-of-contact event after determining the identified user interface object is not moveable, perform a second operation, different from the first operation.

35. The device of claim 33, wherein the vertical displacement parameter for the respective finger is based on at least one of:
a distance between the respective finger and the touch screen display;
a pressure the respective finger has on the touch screen display;
a contact area between the respective finger and the touch screen display;
a voltage between the respective finger and the touch screen display; and a capacitance between the finger and the touch screen display.

36. The device of claim 33, wherein the vertical displacement parameter for the respective finger is a distance between the respective finger and the touch screen display;
   the finger-in-contact event indicates that the distance between the respective finger and the touch screen is less than a first distance threshold value; and
   the finger-out-of-range event indicates that the distance between the respective finger and the touch screen display is greater than a second distance threshold value that is greater than the first distance threshold value.

37. The device of claim 33, wherein the vertical displacement parameter for the respective finger is a pressure the respective finger has on the touch screen display;
   the finger-in-contact event indicates that the pressure the respective finger has on the touch screen is greater than a first pressure threshold value; and
   the finger-out-of-range event indicates that the pressure the respective finger has on the touch screen is less than a second pressure threshold value that is less than the first pressure threshold value.

38. The device of claim 33, wherein the vertical displacement parameter for the respective finger is a contact area between the respective finger and the touch screen display;
   the finger-in-contact event indicates that the contact area between the respective finger and the touch screen is less than a first contact area threshold value; and
   the finger-out-of-range event indicates that the contact area between the respective finger and the touch screen display is greater than a second contact area threshold value that is greater than the first contact area threshold value.

39. The device of claim 33, wherein the vertical displacement parameter for the respective finger is a voltage between the respective finger and the touch screen display;
   the finger-in-contact event indicates that the voltage between the respective finger and the touch screen is less than a first voltage threshold value; and
   the finger-out-of-range event indicates that the voltage between the respective finger and the touch screen display is greater than a second voltage threshold value that is greater than the first voltage threshold value.

40. The device of claim 33, wherein the vertical displacement parameter for the respective finger is a capacitance between the respective finger and the touch screen display;
   the finger-in-contact event indicates that the capacitance between the respective finger and the touch screen is greater than a first contact area threshold value; and
   the finger-out-of-range event indicates that the capacitance between the respective finger and the touch screen display is less than a second contact area threshold value that is less than the first contact area threshold value.

41. The device of claim 33, wherein the identified moveable user interface object includes a slide object that is moveable along a slide bar, wherein said step of performing the first operation further comprises:
   moving the slide object along the slide bar from its current position to a transit position determined at least in part by a projection of each of the one or more first and second finger-dragging events' associated positions on the touch screen display onto the slide bar.

42. The device of claim 41, wherein at least one of the associated positions is off the slide bar and the slide object is moved along the slide bar to the transit position that is at least in part determined by a projection of the associated position onto the slide bar.

43. The computer readable storage medium of claim 34, wherein the vertical displacement parameter for the respective finger is based on at least one of:
   a distance between the respective finger and the touch screen display;
   a pressure the respective finger has on the touch screen display;
   a contact area between the respective finger and the touch screen display;
   a voltage between the respective finger and the touch screen display; and
   a capacitance between the finger and the touch screen display.

44. The computer readable storage medium of claim 34, wherein the vertical displacement parameter for the respective finger is a distance between the respective finger and the touch screen display;
   the finger-in-contact event indicates that the distance between the respective finger and the touch screen is less than a first distance threshold value; and
   the finger-out-of-range event indicates that the distance between the respective finger and the touch screen display is greater than a second distance threshold value that is greater than the first distance threshold value.

45. The computer readable storage medium of claim 34, wherein the vertical displacement parameter for the respective finger is a pressure the respective finger has on the touch screen display;
   the finger-in-contact event indicates that the pressure the respective finger has on the touch screen is greater than a first pressure threshold value; and
   the finger-out-of-range event indicates that the pressure the respective finger has on the touch screen is less than a second pressure threshold value that is less than the first pressure threshold value.

46. The computer readable storage medium of claim 34, wherein the vertical displacement parameter for the respective finger is a contact area between the respective finger and the touch screen display;
   the finger-in-contact event indicates that the contact area between the respective finger and the touch screen is less than a first contact area threshold value; and
   the finger-out-of-range event indicates that the contact area between the respective finger and the touch screen display is greater than a second contact area threshold value that is greater than the first contact area threshold value.

47. The computer readable storage medium of claim 34, wherein the vertical displacement parameter for the respective finger is a voltage between the respective finger and the touch screen display;
   the finger-in-contact event indicates that the voltage between the respective finger and the touch screen is less than a first voltage threshold value; and
   the finger-out-of-range event indicates that the voltage between the respective finger and the touch screen display is greater than a second voltage threshold value that is greater than the first voltage threshold value.

48. The computer readable storage medium of claim 34, wherein the vertical displacement parameter for the respective finger is a capacitance between the respective finger and the touch screen display;
   the finger-in-contact event indicates that the capacitance between the respective finger and the touch screen is greater than a first contact area threshold value; and
   the finger-out-of-range event indicates that the capacitance between the respective finger and the touch screen display is less than a second contact area threshold value that is less than the first contact area threshold value.

49. The computer readable storage medium of claim 34, wherein the identified moveable user interface object includes a slide object that is moveable along a slide bar, wherein said step of performing the first operation further comprises:

moving the slide object along the slide bar from its current position to a transit position determined at least in part by a projection of each of the one or more first and second finger-dragging events' associated positions on the touch screen display onto the slide bar.

50. The computer readable storage medium of claim 49, wherein at least one of the associated positions is off the slide bar and the slide object is moved along the slide bar to the transit position that is at least in part determined by a projection of the associated position onto the slide bar.

51. The method of claim 28, wherein the vertical displacement parameter for the respective finger is based on at least one of:

a distance between the respective finger and the touch screen display;
a pressure the respective finger has on the touch screen display;
a contact area between the respective finger and the touch screen display;
a voltage between the respective finger and the touch screen display; and
a capacitance between the finger and the touch screen display.

52. The method of claim 28, wherein the vertical displacement parameter for the respective finger is a distance between the respective finger and the touch screen display;

the finger-in-contact event indicates that the distance between the respective finger and the touch screen is less than a first distance threshold value; and
the finger-out-of-range event indicates that the distance between the respective finger and the touch screen display is greater than a second distance threshold value that is greater than the first distance threshold value.

53. The method of claim 28, wherein the vertical displacement parameter for the respective finger is a pressure the respective finger has on the touch screen display;

the finger-in-contact event indicates that the pressure the respective finger has on the touch screen is greater than a first pressure threshold value; and
the finger-out-of-range event indicates that the pressure the respective finger has on the touch screen is less than a second pressure threshold value that is less than the first pressure threshold value.

54. The method of claim 28, wherein the vertical displacement parameter for the respective finger is a contact area between the respective finger and the touch screen display;

the finger-in-contact event indicates that the contact area between the respective finger and the touch screen is less than a first contact area threshold value; and
the finger-out-of-range event indicates that the contact area between the respective finger and the touch screen display is greater than a second contact area threshold value that is greater than the first contact area threshold value.

55. The method of claim 28, wherein the vertical displacement parameter for the respective finger is a voltage between the respective finger and the touch screen display;

the finger-in-contact event indicates that the voltage between the respective finger and the touch screen is less than a first voltage threshold value; and
the finger-out-of-range event indicates that the voltage between the respective finger and the touch screen display is greater than a second voltage threshold value that is greater than the first voltage threshold value.

56. The method of claim 28, wherein the vertical displacement parameter for the respective finger is a capacitance between the respective finger and the touch screen display;

the finger-in-contact event indicates that the capacitance between the respective finger and the touch screen is greater than a first contact area threshold value; and
the finger-out-of-range event indicates that the capacitance between the respective finger and the touch screen display is less than a second contact area threshold value that is less than the first contact area threshold value.

\* \* \* \* \*